(12) United States Patent
Perras et al.

(10) Patent No.: US 12,212,404 B2
(45) Date of Patent: Jan. 28, 2025

(54) MULTI-HOP WIRELESS RELAY SUPPORT

(71) Applicant: INTERDIGITAL PATENT HOLDINGS, INC., Wilmington, DE (US)

(72) Inventors: Michelle Perras, Montreal (CA); Saad Ahmad, Montreal (CA); Eldad Zeira, Encinitas, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 481 days.

(21) Appl. No.: 17/605,853

(22) PCT Filed: Apr. 23, 2020

(86) PCT No.: PCT/US2020/029515
§ 371 (c)(1),
(2) Date: Oct. 22, 2021

(87) PCT Pub. No.: WO2020/219670
PCT Pub. Date: Oct. 29, 2020

(65) Prior Publication Data
US 2022/0224409 A1 Jul. 14, 2022

Related U.S. Application Data

(60) Provisional application No. 62/837,494, filed on Apr. 23, 2019.

(51) Int. Cl.
*H04B 7/26* (2006.01)
*H04W 40/22* (2009.01)

(52) U.S. Cl.
CPC .......... *H04B 7/2606* (2013.01); *H04W 40/22* (2013.01)

(58) Field of Classification Search
CPC ........... H04B 7/26; H04L 12/73; H04L 12/80; H04L 5/00; H04W 40/22; H04W 88/04;
(Continued)

(56) References Cited

U.S. PATENT DOCUMENTS 7,443,822 B2 * 10/2008 Lindskog .............. H04W 28/18
370/329
7,561,525 B2 * 7/2009 Saito ....................... H04L 45/26
455/7

(Continued)

FOREIGN PATENT DOCUMENTS

WO 2016109032 A1 7/2016

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Man U Phan
(74) *Attorney, Agent, or Firm* — Volpe Koenig

(57) ABSTRACT

Methods, devices, and systems are disclosed for multi-hop relays that may be implemented by advertising first relaying capabilities and a first number of hops to reach a remote wireless transmit/receive unit (WTRU), receiving second relaying capabilities and a second number of hops to reach the remote WTRU from a selected relay WTRU, updating a relay capabilities table based on the second relaying capabilities and the second number of hops, receiving a packet comprising a payload, the packet having a traffic type and further comprising a maximum number of hops, selecting the selected relay WTRU based on the traffic type, the maximum number of hops, and the relay capabilities table, (Continued)

generating a first updated packet comprising the payload, the traffic type and a first updated number of hops that is one less than the maximum number of hops, and transmitting the first updated packet to the selected relay WTRU.

18 Claims, 14 Drawing Sheets

(58) Field of Classification Search
CPC ..... H04W 84/18; H04W 40/24; H04W 36/00; H04W 72/04; H04W 92/18; H04W 76/14; H04W 36/03; H04W 36/30; H04W 72/20; H04W 12/10; H04W 72/25; H04W 72/21; H04W 28/02; H04W 4/02; H04W 4/40; H04W 40/38; H04W 8/00
USPC .......................................................... 370/315
See application file for complete search history.

(56) References Cited

U.S. PATENT DOCUMENTS

| | | | | |
|---|---|---|---|---|
| 7,848,774 | B2* | 12/2010 | Park | H04W 40/16 455/11.1 |
| 8,078,159 | B2* | 12/2011 | Kang | H04W 16/26 455/425 |
| 9,414,338 | B2* | 8/2016 | Cai | H04W 56/00 |
| 9,942,944 | B2* | 4/2018 | Phuyal | H04L 5/0048 |
| 10,778,322 | B2* | 9/2020 | Gandikota | H04B 7/14 |
| 10,904,933 | B2* | 1/2021 | Bangolae | H04W 88/04 |
| 11,233,722 | B2* | 1/2022 | Tenny | H04L 43/16 |
| 2008/0075094 | A1* | 3/2008 | Ahn | H04B 7/155 370/400 |
| 2016/0044613 | A1 | 2/2016 | Cai et al. | |
| 2016/0150459 | A1* | 5/2016 | Patil | H04W 40/28 370/328 |
| 2018/0343200 | A1* | 11/2018 | Jana | H04L 45/70 |
| 2021/0314112 | A1* | 10/2021 | Balasubramanian | H04L 5/001 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

SA WG1, "New SID on enhanced relays for energy efficiency and extensive coverage," 3GPP TSG-SA Meeting #81, SP-180785, Gold Coast, Australia, (Sep. 12-14, 2018).

Third Generation Partnership Project, "Technical Specification Group Services and System Aspects; Proximity-based services (ProSe); Stage 2 (Release 15)," 3GPP TS 23.303 V15.1.0 (Jun. 2018).

* cited by examiner

MULTI-HOP WIRELESS RELAY SUPPORT

CROSS-REFERENCE TO RELATED APPLICATIONS

This application is the U.S. National Stage, under 35 U.S.C. § 371, of International Application No. PCT/US2020/029515 filed Apr. 23, 2020, which claims the benefit of U.S. Provisional Application No. 62/837,494 filed Apr. 23, 2019, the contents of which are incorporated herein by reference.

BACKGROUND

Network relays are a compound of a Node-B from the wireless transmit/receive unit (WTRU) end, and a WTRU, from the network end. Network relays are sometimes used by an operator to extend network coverage, though often at the expense of network capacity.

The use of WTRUs as relays has been limited to mission critical and vehicle-to-everything (V2X) operations, both in broadcast mode, where relay selection may not meaningful. Further, WTRUs as relays were specified only for two hops (i.e., remote WTRU to relay WTRU to gNB). Better energy efficiency and more extensive coverage may be required when compared to existing techniques.

SUMMARY

Methods, devices, and systems are disclosed for multi-hop relays in a mesh network. According to embodiments, such techniques may be implemented by advertising first relaying capabilities and a first number of hops to reach a remote wireless transmit/receive unit (WTRU), receiving second relaying capabilities and a second number of hops to reach the remote WTRU from a selected relay WTRU, updating a relay capabilities table based on the second relaying capabilities and the second number of hops, receiving a packet comprising a payload, the packet having a traffic type and further comprising a maximum number of hops, selecting the selected relay WTRU based on the traffic type, the maximum number of hops, and the relay capabilities table, generating a first updated packet comprising the payload, the traffic type and a first updated number of hops that is one less than the maximum number of hops, and transmitting the first updated packet to the selected relay WTRU.

The selected relay WTRU may be selected based on the second relaying capabilities comprising the traffic type. The relay capabilities table may comprise the second number of hops and the selected relay WTRU is selected based on the second number of hops being less than the first updated number of hops. The remote WTRU may be out of coverage from a core network. The packet may further comprise a remote WTRU identifier. The traffic type may be one of a Mobility Management (MM) signaling, Session Management (SM) signaling, and user plane data. Additionally, when the first updated number is be less than one, the packet may be discarded. A one-to-one connection may be established with the selected relay WTRU. Updating the relay capabilities table may be based on advertisements by each other of a plurality of relay WTRUs in the mesh network and the advertising may comprises each relay WTRU of the plurality of relay WTRUs advertising the number of hops to reach the remote WTRU, per traffic type.

According to embodiments, such techniques may be implemented by advertising first relaying capabilities and a first number of hops to reach a core network, receiving second relaying capabilities and a second number of hops to reach the core network from a selected relay WTRU, updating a relay capabilities table based on the second relaying capabilities and the second number of hops, receiving a packet comprising a payload, the packet having a traffic type and further comprising a maximum number of hops, selecting the selected relay WTRU based on the traffic type, the maximum number of hops, and the relay capabilities table, generating a first updated packet comprising the payload, the traffic type and a first updated number of hops that is one less than the maximum number of hops, and transmitting the first updated packet to the selected relay WTRU.

The selected relay WTRU may be selected based on the second relaying capabilities and/or may be selected based on the second number of hops being less than the first updated number of hops. Each relay WTRU of a plurality of relay WTRUs in the mesh network may update its relay capabilities table based on advertisements by each other of the plurality of relay WTRUs in the mesh network.

According to embodiments, such techniques may be implemented by a WTRU comprising a transmitter, a receiver, and a processor. The WTRU may be configured to advertise, via the transmitter, first relaying capabilities and a first number of hops to reach a remote WTRU, receive, via the receiver, second relaying capabilities and a second number of hops to reach the remote WTRU from a selected relay WTRU, update, via the processor, a relay capabilities table based on the second relaying capabilities and the second number of hops, receive, via the receiver, a packet comprising a payload, the packet having a traffic type and further comprising a maximum number of hops, select, via the processor, the selected relay WTRU based on the traffic type, the maximum number of hops, and the relay capabilities table, generate, via the processor, a first updated packet comprising the payload, the traffic type and a first updated number of hops that is one less than the maximum number of hops, and transmit, via the transmitter, the first updated packet to the selected relay WTRU. The packet may further comprise a remote WTRU identifier. The processor may update the relay capabilities table based on an advertisement by at least one relay WTRU of a plurality of WTRUs in a mesh network.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
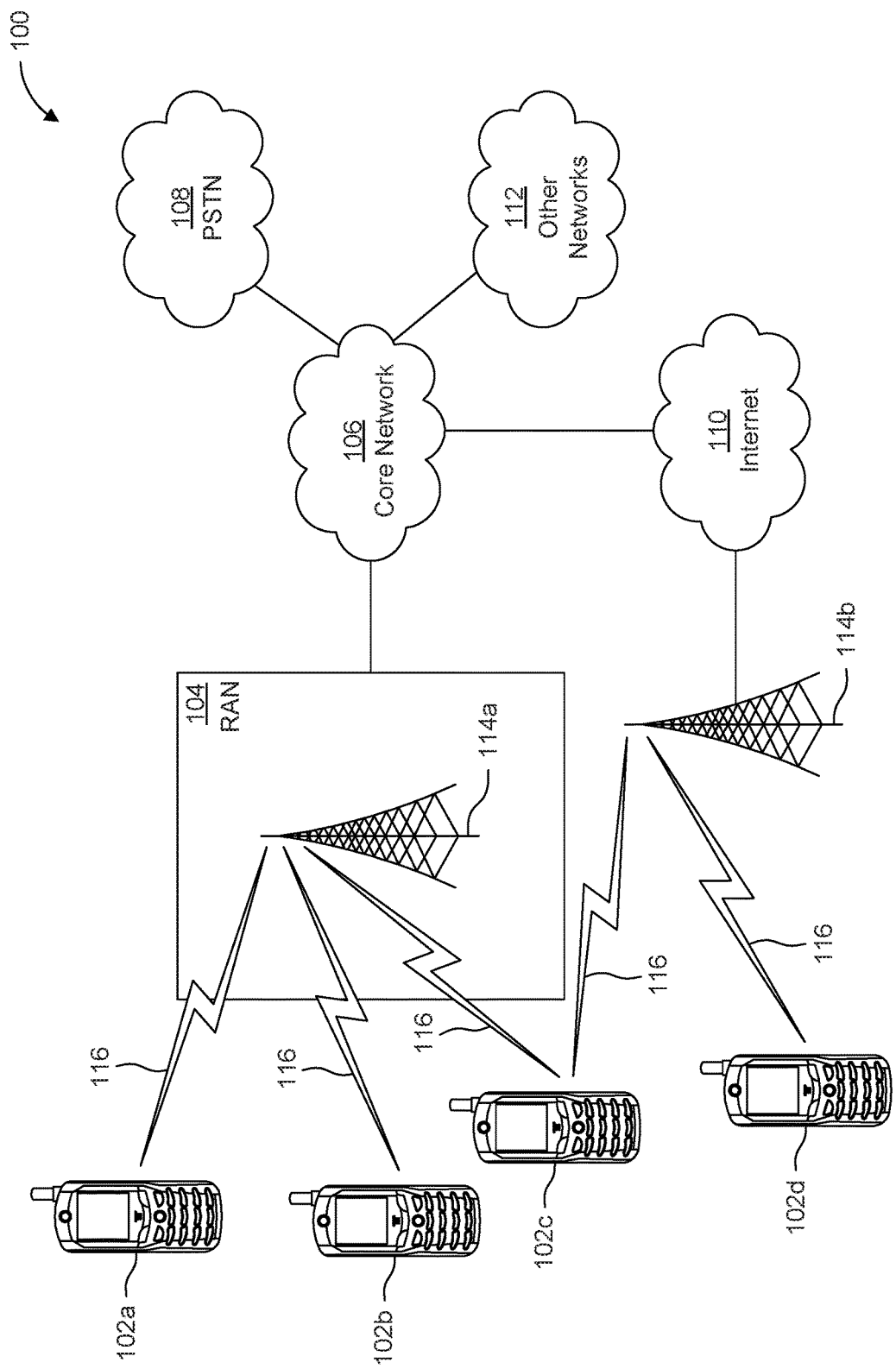
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
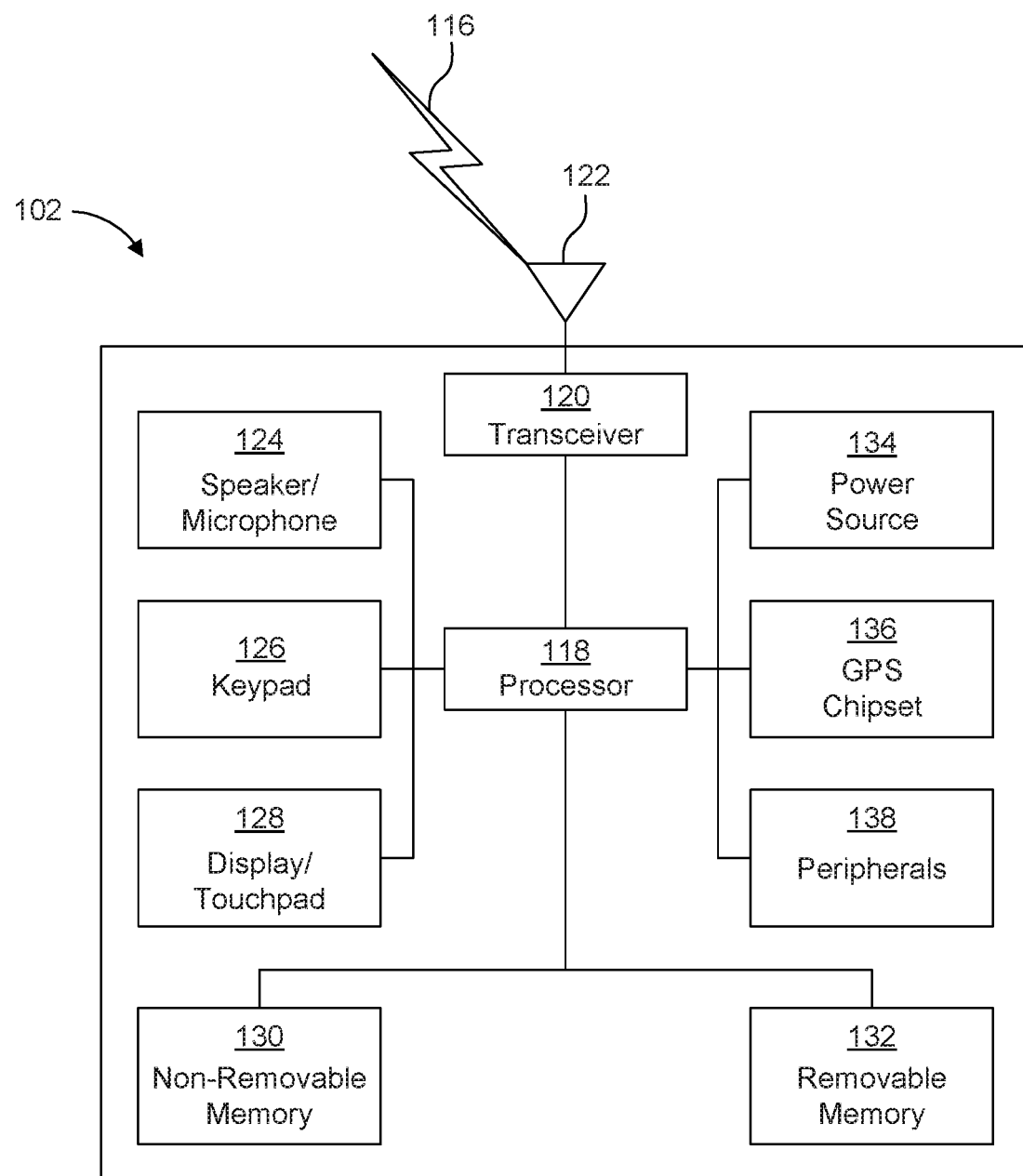
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
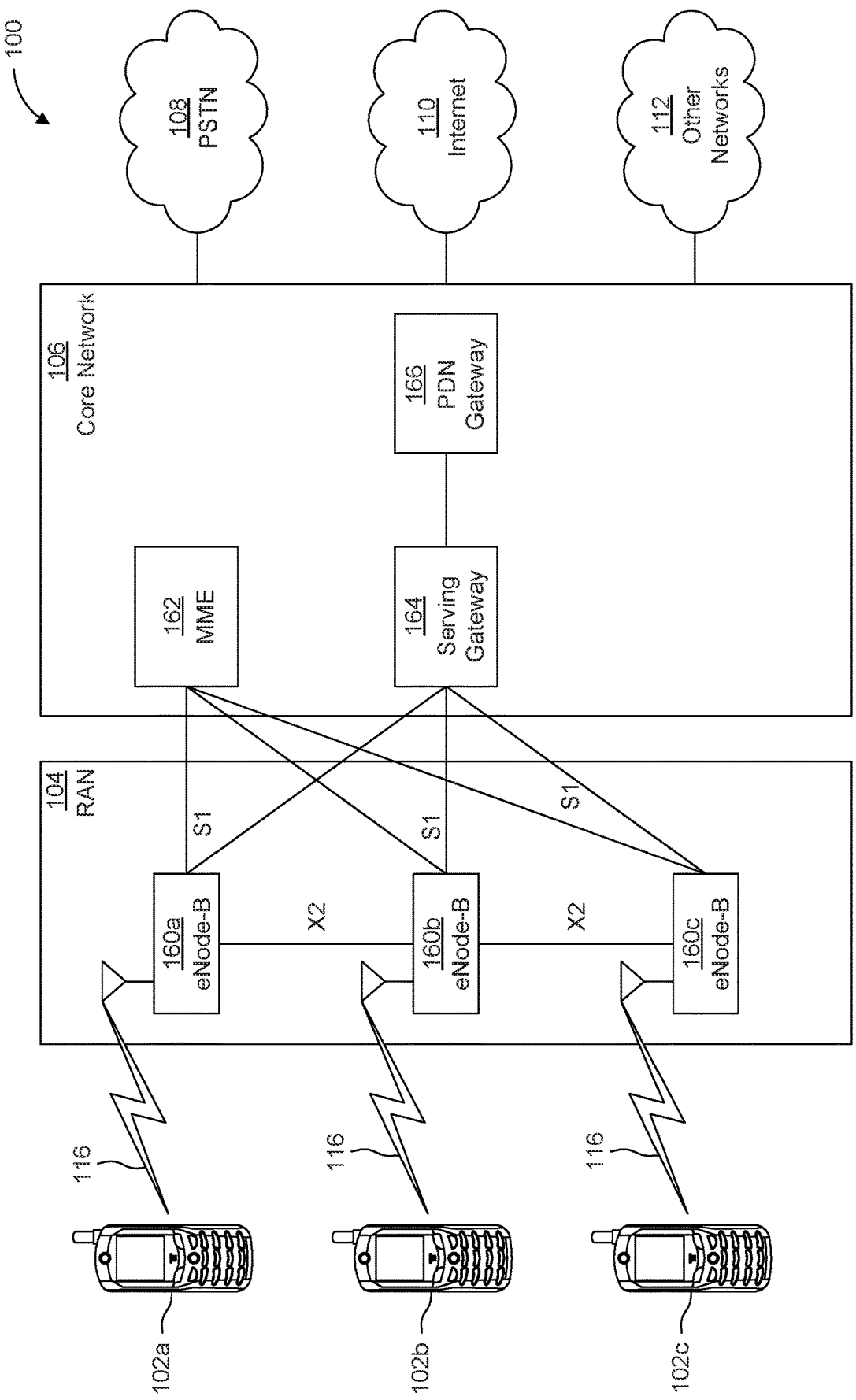
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
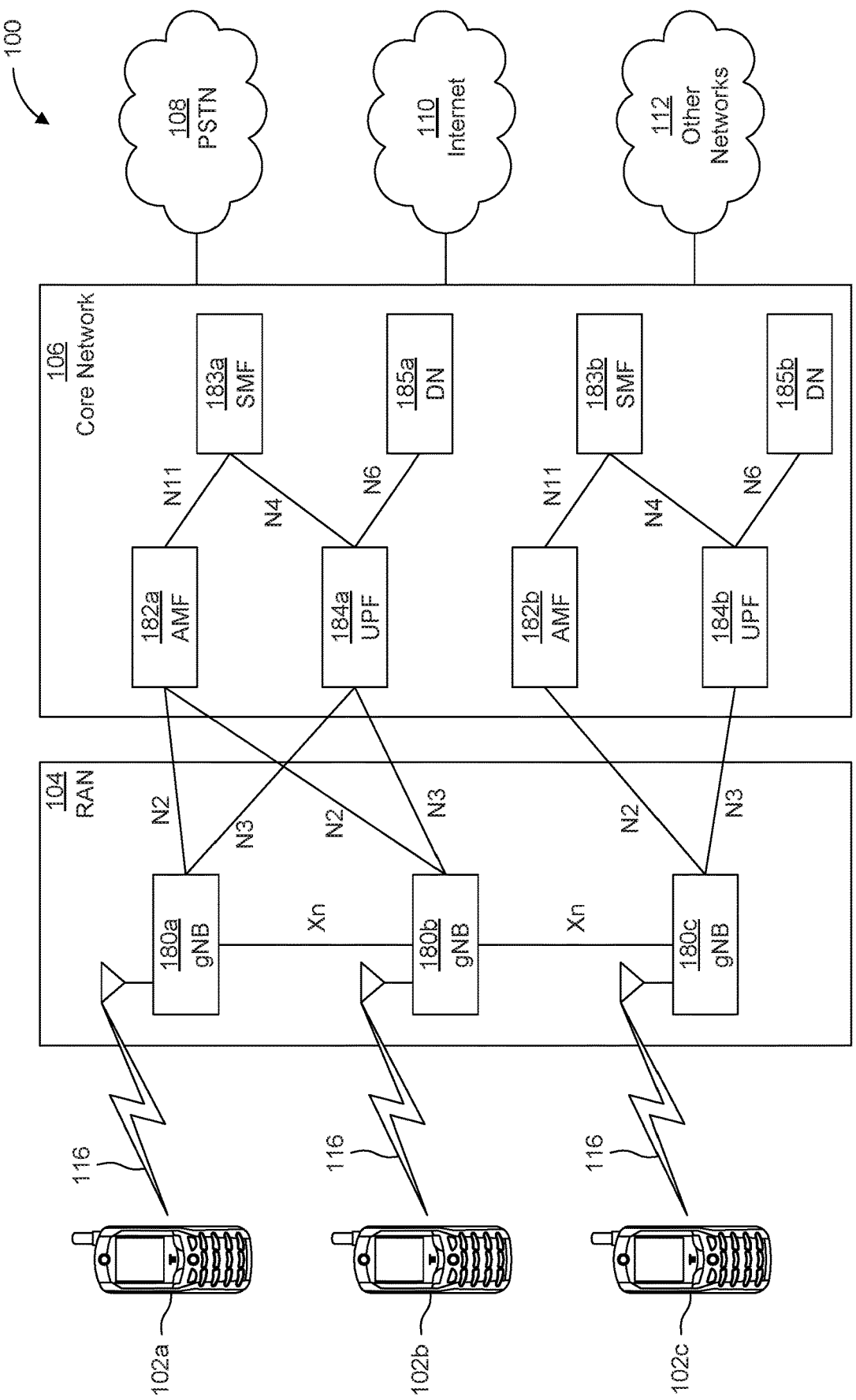
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

According to implementations disclosed herein, WTRUs may be connected in a mesh network that may allow network communication with remote WTRUs, that are out of coverage to reach the network, via Relays and Edge WTRUs (e.g., WTRUs connected to the network). The Relays and Edge WTRUs relay the traffic between a remote WTRU and the network in uplink (UL) and downlink (DL) directions. Each Relay WTRU may be provisioned for one or more types of traffic to be supported. The types of traffic may include, for example, Mobility Management (MM) signaling, Session Management (SM) signaling, user plane data, etc. An Edge WTRU is connected to the network (e.g., a core network) and is also a Relay WTRU that can support all applicable types of traffic.

To enable the relay of traffic (e.g., multi-hop relay of traffic), a Relay WTRU may advertise its relaying capabilities (e.g., MM signaling capability, SM signaling capability and/or user plane data capability), distance to the network (i.e., number of hops to the traverse to reach the network), and lists of Remote WTRUs that it may reach with corresponding distance (i.e., number of hops to reach one or more Remote WTRU). As applied herein, a WTRU (e.g., a remote WTRU, a relay WTRU, and/or an Edge relay WTRU) may advertise, transmit, and/or receive information using one or more antennas such as transmit antennas, receive antennas, or transceivers. Such components may be referred to as transceivers and/or receivers.

Figure 2:
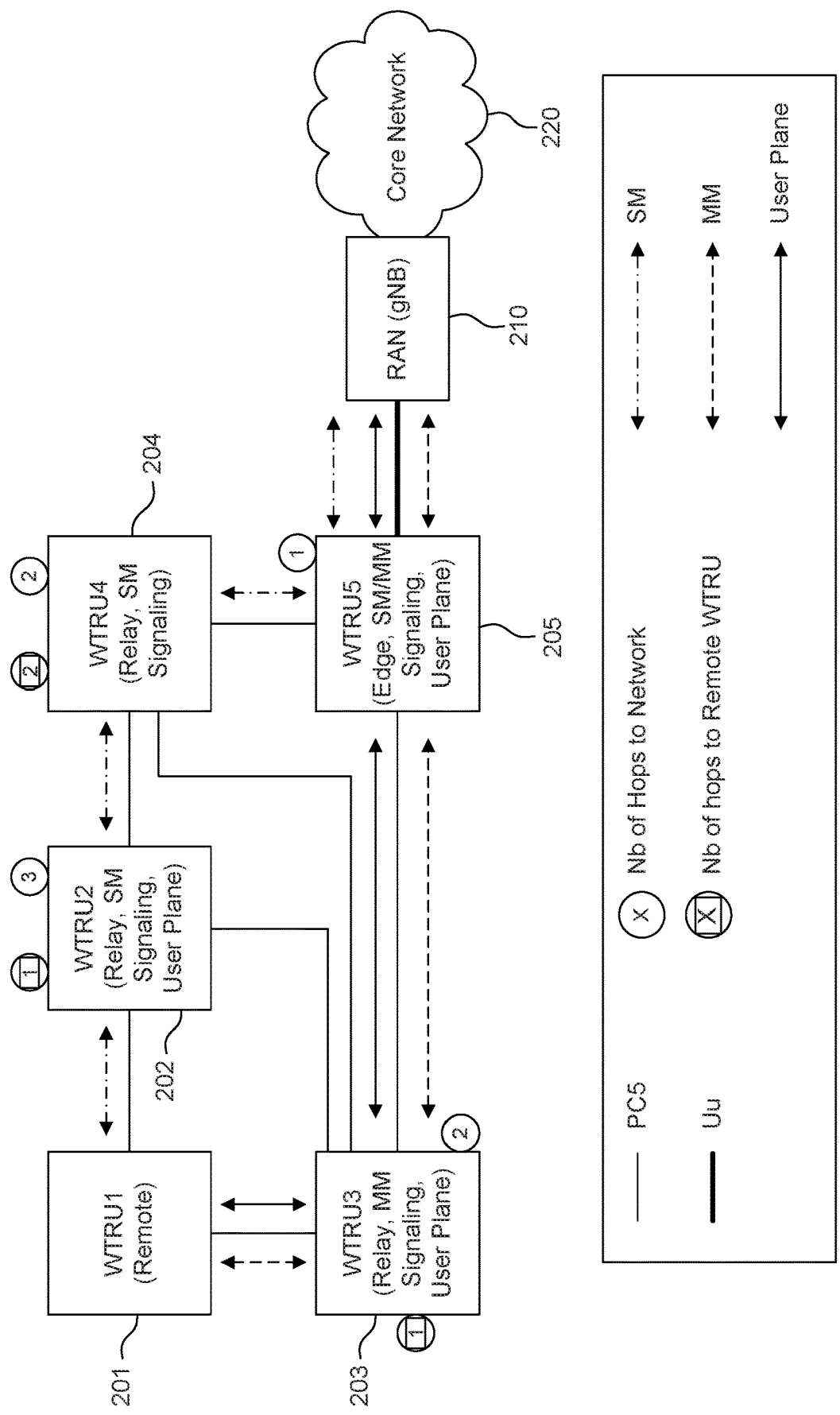
FIG. 2 is a system diagram illustrating an example of a mesh network of relay WTRUs.

FIG. 2 illustrates the mesh network of Relay WTRUs specifying the number of hops in the UL and DL directions and the supported traffic types per Relay WTRU. As shown in FIG. 2, WTRU1 201 is a remote WTRU that may be configured to receive data from one or more of the Relay WTRUs 202, 203, 204, and/or 205 and which may not be able to receive data directly from the core network 220. Relay WTRU2 202 may be configured for and may advertise its capabilities including SM signaling and user plane data and may also advertise the number of hops to remote WTRU1 201 (i.e., 1 hop) and to the core network 220 (i.e., 3 hops). Relay WTRU3 203 may be configured for and may advertise its capabilities including MM signaling and user plane data and may also advertise the number of hops to remote WTRU1 201 (i.e., 1 hop) and to the core network 220 (i.e., 2 hops). Relay WTRU4 204 may be configured for and may advertise its capabilities including SM signaling and may also advertise the number of hops to remote WTRU1 201 (i.e., 2 hops) and to the core network 220 (i.e., 2 hops). Edge Relay WTRU5 205 may be configured for and may advertise its capabilities including SM signaling, MM signaling, and user plane data and may also advertise the number of hops to the core network 220 (i.e., 1 hop). FIG. 2 also shows the respective paths, per capability, that a given capability specific transmission can traverse through each relay WTRU. For example, a UL user plane data transmission from WTRU2 to the core network 220 may traverse from WTRU2, to WTRU3, to WTRU5, before it reaches the core network 220 via RAN (gNB) 210.

The one or more relay WTRUs, as shown in FIG. 2, may advertise their capabilities, numbers of hops to a one or more remote WTRUs and/or network, and a list of remote WTRUs that it can reach by transmitting a wireless signal at a pre-determined time, upon a request for advertising received by each respective WTRU, or based on one or more other criteria.

Additionally, it should be noted that a given relay WTRU may support more than one type of traffic. The number of hops advertised by a given relay may correspond to the number of hops to a remote WTRU or network using any one of the types of traffic that the given relay WTRU supports.

One-to-one communication, such as Proximity Services (ProSe) may be established between Relay WTRUs, Remote WTRUs and Edge WTRU for traffic forwarding (not shown). One-to-one communication may be used to transport traffic of different types (e.g., MM signaling, SM signaling, user plane data, etc.).

A Remote WTRU (e.g., Remote WTRU1 201 of FIG. 2) and an Edge WTRU (e.g., WTRU 5 205 of FIG. 2) insert packets (i.e., data) into a mesh network of Relay WTRUs. Each packet may include the Remote WTRU ID, an allowed number of hops, a direction (i.e., UL or DL) and a traffic type (e.g., MM signaling, SM signaling or user plane data). The Remote WTRU identifier is determined based on the traffic type. According to an implementation, the Remote WTRU ID, allowed number of hops, direction, and/or traffic type may be stored in a packet header for each of the respective packets inserted into the mesh by a Remote WTRU and/or an Edge WTRU.

A Relay WTRU may receive a packet to be relayed based on the Relay WTRU's capabilities (e.g., MM signaling, SM signaling or user plane data), from the Remote WTRU, the Edge WTRU, or another Relay WTRU. The Relay WTRU may check the allowed number of hops, subtracts one hop, and update the packet (e.g., packet header) with a new number of resulting hops (e.g., a new number of allowed hops). The Relay WTRU may use information contained in the packet to determine if the packet should be forwarded in the UL or DL direction. For example, the source and/or destination information may be contained in the packet and the Relay WTRU may use this information to determine the direction of the packet transmission. The Relay WTRU may search its relay capabilities table for the Edge WTRU to forward the received data for a UL packet and search for the Remote WTRU for a DL packet.

A Relay WTRU may determine a subsequent hop for a given packet by referencing its relay capabilities table. If the Relay WTRU is not directly connected to the Remote WTRU (for a DL) or Edge WTRU (for a UL), the Relay WTRU may consider the advertised capabilities of the next hop WTRU (e.g., supported traffic type) for the next hop selection. Once the next hop is identified, the Relay WTRU may forward the packet to the selected WTRU. Notably, the Relay WTRU may forward packet to the next hop, as determined based on the relay capabilities table, if the number of allowed hops is greater than one. If the number of allowed hops is 1 or 0, the Relay WTRU may discard the packet.

Each WTRU participating in a mesh network of WTRUs may be provisioned with a specific role for traffic handling (e.g., relay or edge), as well as the allowed type of traffic it is configured to handle. The WTRU may be configured to handle one or more of the following types of traffic: MM signaling, SM signaling and/or user plane data. One or multiple values may be configured on each WTRU.

An MM signaling traffic type may be used to identify control plane traffic related to mobility management, which is generally transmitted through the Core Access and Mobility Management Function (AMF) in the 5G network (e.g., Restoration messages, Service request, tracking area update and generic uplink and downlink NAS messages). For example, provisioning traffic sent by an application server to the WTRU may be transmitted through the 5G network and AMF. In this example, the provisioning traffic is of type MM signaling. An Edge WTRU may typically use signaling radio bearers to send/receive MM signaling traffic to/from the CN.

A SM signaling traffic type may be used to identify control plane traffic related to session management, which is generally handled by the SMF in the 5G network (e.g., PDU Session Establishment, modification, release message, and QoS modification procedures). For example, a WTRU seeking to exchange traffic with an external entity (e.g., IP traffic) needs to establish a PDU session and obtain an IP address. The traffic related to the establishment and maintenance of this session if of type SM signaling. The Edge WTRU typically uses signaling radio bearers to send/receive this type of traffic to/from the CN.

A user plane traffic type is used to identify traffic (e.g., exchanged between an application running on a WTRU and an application server). This traffic is typically IP traffic, but may also be non-IP traffic or Ethernet traffic. For example, a mail application running on a WTRU exchanges packets with a mail server to download emails onto the WTRU. In this case, the provisioning traffic is of type user plane. The Edge WTRU typically uses data radio bearers to send/receive this type of traffic to and from the CN. The user traffic in the UL may originate from different applications running on a Remote WTRU, whereas in DL and application server (AS), another WTRU may be sending the user plane traffic. The user plane traffic may be small infrequent packets, application level control signaling or continuous stream data packets.

The traffic type may also be provisioned per application type or ID (e.g., a mapping table between the application ID and traffic type to be provisioned). For example, a Cellular Internet of Things (CIoT) application may generate user plane traffic that should be sent over a control plane interface (i.e., traffic type is MM signaling or SM signaling), since the packets are typically small and very few are sent infrequently. Another type of application (e.g., streaming application), generating user plane traffic with large packet size should be send over the user name interface (i.e., traffic type is user plane data). QoS parameters (e.g., maximum latency, etc.) may also be configured per traffic type.

A maximum number of hops allowed per traffic type may be provisioned. This value can be added to the traffic forwarded into the mesh network (e.g., via a packet header). Additionally or alternatively, the mapping between the QoS parameters and the maximum number of hops the packet should be transmitted in both UL and DL direction may be provisioned. For example, a Remote WTRU introducing traffic in the mesh network may set the maximum number of hops allowed based on, for example, the traffic type, into the packet before forwarding the packet to the next Relay WTRU. The same behavior may apply to the Edge WTRU, which can also introduce traffic into the mesh network.

A Remote WTRU can be a WTRU which is generating traffic to be sent to the network via the mesh-of-WTRUs-to network.

A WTRU may be configured as a Relay and generate data to be sent to the network. Therefore, a WTRU may behave as a relay for a Remote WTRU and may be a Remote WTRU itself (i.e., using a Relay WTRU to forward its traffic to the network).

Each Relay or Edge WTRU advertises (e.g., broadcasts) to other WTRUs its capabilities and how many hops it is located from the network, per traffic type, in the UL direction. The supported application IDs/types may also be advertised. Additionally, each Relay WTRU advertises a list of Remote WTRUs that the Relay WTRU may reach with the corresponding number of hops, per traffic type (e.g., DL direction). The capabilities include the traffic type and may include the WTRU's role (i.e., Relay and/or Edge). The number of hops from the network represent the number of relays to traverse to reach the network and the number of hops to the Remote WTRU represents the number of relays to traverse to reach a given Remote WTRU. It will be understood that a mesh network may include a plurality of Remote WTRUs.

A Remote WTRU may be identified using a unique identifier that is specified and readable in all packets that are relayed in the mesh network (e.g., a L2 ID, an IP address, Subscription Concealed Identifier (SUCI), etc.). Each WTRU (e.g., Relay WTRU and Remote WTRU) may learn how many hops it is located from the network based on the advertisements of the Relay WTRUs and Edge WTRUs.

Figure 3:
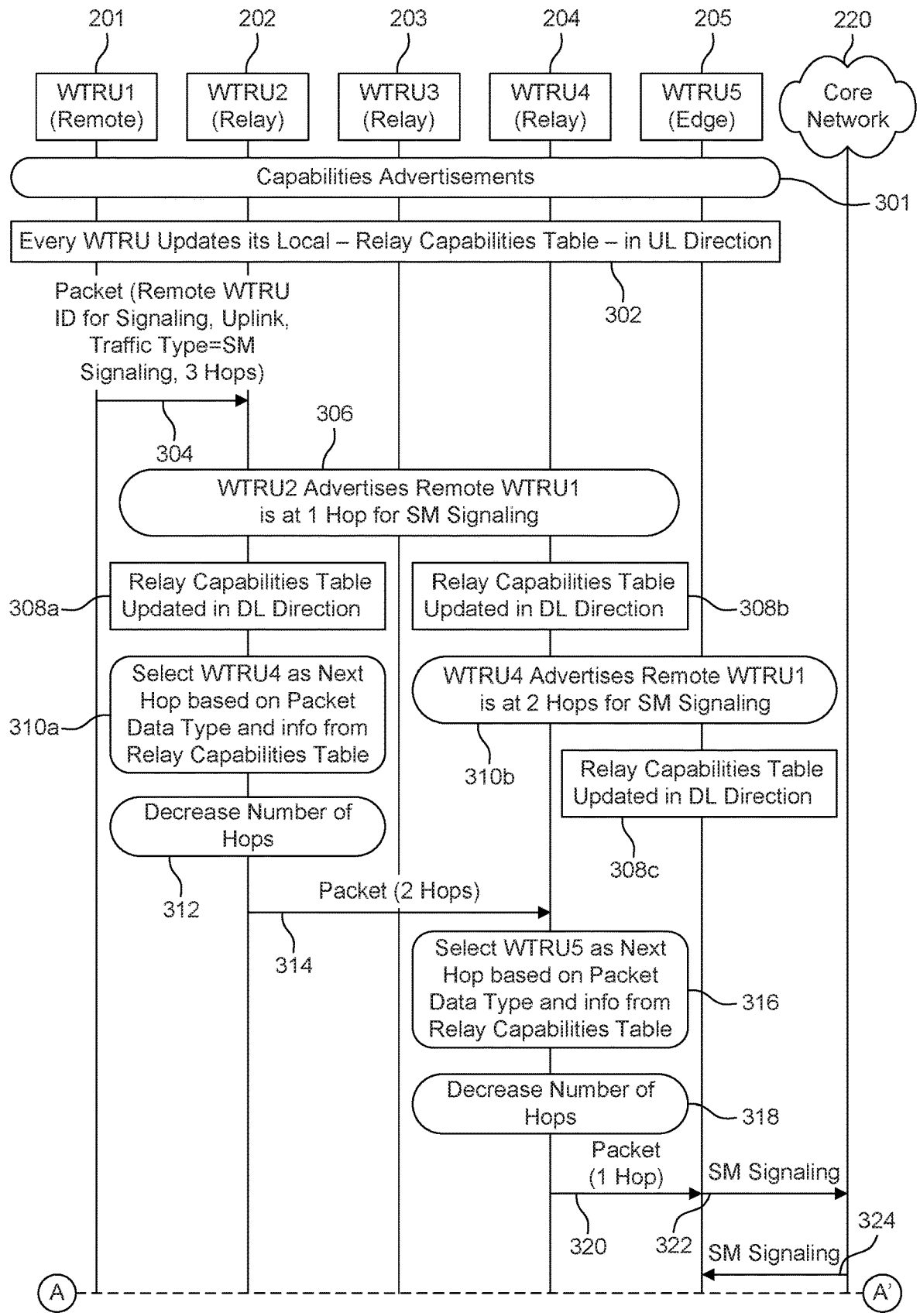
FIG. 3 is a diagram illustrating an example method for multi-hop relay.
Figure 3:
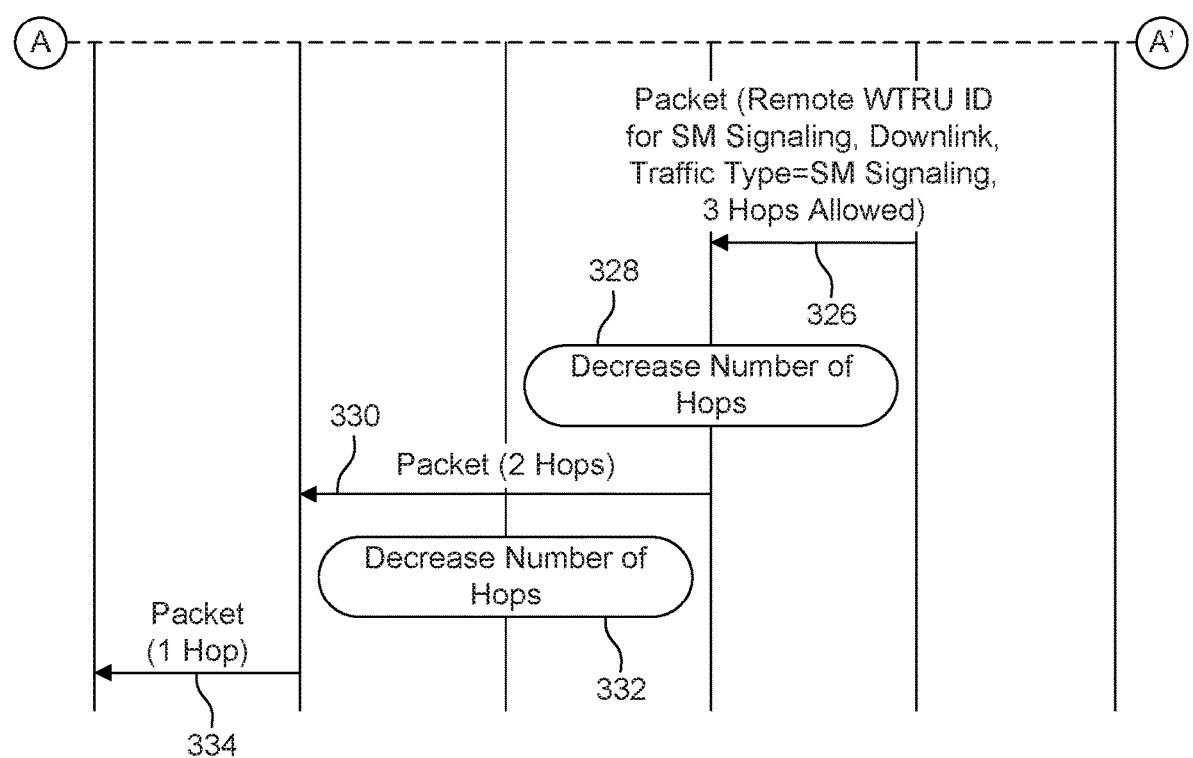

FIG. 3 is an example diagram that illustrates all or a subset of the Relay WTRUs building a local relay capabilities table based on the Relay WTRU advertisements. As shown in FIG. 3, the WTRUs 201, 202, 203, 204, and 205 may be part of a mesh network where WTRU 201 is a remote WTRU and WTRU 205 is an Edge Relay connected to core network 220. WTRUs 202, 203 and 204 are Relay WTRUs. At 301 the relays may advertise their capabilities and each Relay WTRU may update its local relay capabilities table in at least the UL direction at 302.

At 304, Remote WTRU1 201 transmits a packet comprising a Remote WTRU ID corresponding to Remote WTRU1 201, indicating the direction of the transmission (i.e., UL), indicating the traffic type (i.e., SM signaling), and a number of hops (i.e., 3 hops). At 306, WTRU2 202 advertises that Remote WTRU1 201 is 1 hop away from WTRU2 202 for a SM signaling traffic type. At 308a the relay capabilities table for WTRU2 202 is updated in the DL direction and at 308b the relay capabilities table for WTRU4 204 is updated in the DL direction. At 310a, WTRU4 204 is selected by WTRU2 202 as a next hop based on the direction of the transmission (i.e., UL), the traffic type (i.e., SM signaling), and a number of hops (i.e., 3 hops) available based on the packet transmitted at 304. At 312, the number of hops (i.e., 3 hops) may be reduced by 1 (i.e., resulting in a total of 2 hops) to account for the hop from Relay WTRU1 201 to Relay WTRU2 202. Further, at 310*b*, Relay WTRU4 204 may advertise that the Remote WTRU1 201 is 2 hops away for SM signaling and at 308*c*, Edge WTRU5 205 updates its relay capabilities in the DL direction.

At 314, the packet updated to include a maximum of 2 hops is transmitted to WTRU4 204 and at 316 Edge WTRU5 205 is selected by WTRU4 204 as a next hop based on the direction of the transmission (i.e., UL), the traffic type (i.e., SM signaling), and a number of hops (i.e., 2 hops) available based on the packet transmitted at 314. At 318, the number of hops (i.e., 2 hops) may be reduced by 1 (i.e., resulting in a total of 1 hop) to account for the hop from Relay WTRU2 202 to Relay WTRU4 204. At 320 the packet updated to include a maximum of 1 hop is transmitted to Edge WTRU5 205 and at 322 Edge WTRU5 205 transmits the packet to the core network 220 via SM signaling to complete the uplink transmission of the packet from Remote WTRU1 201 to the core network 220.

Further, at 324, the core network 220 provides a packet via SM signaling, the packet addressed for Remote WTRU1 201 (e.g., via Remote WTRU ID). At 324, the packet is provided to Edge WTRU5 205 with provisions. At 326 Edge WTRU5 205 transmits the packet comprising a Remote WTRU ID corresponding to Remote WTRU1 201, indicating the direction of the transmission (i.e., DL), indicating the traffic type (i.e., SM signaling), and a number of hops (i.e., 3 hops). At 328 the number of hops (i.e., 3 hops) is reduced by 1 to account for the transmission 326 from Edge WTRU5 205 to Relay WTRU4 204. At 330, Relay WTRU4 204 transmits the packet comprising the Remote WTRU ID corresponding to Remote WTRU1 201, indicating the direction of the transmission (i.e., DL), indicating the traffic type (i.e., SM signaling), and a number of hops (i.e., 2 hops) to Relay WTRU2 202. At 332 the number of hops (i.e., 2 hops) is reduced by 1 to account for the transmission 330 from Relay WTRU4 204 to Relay WTRU2 202. At 334, Relay WTRU2 202 transmits the packet comprising the Remote WTRU ID corresponding to Remote WTRU1 201, indicating the direction of the transmission (i.e., DL), indicating the traffic type (i.e., SM signaling), and a number of hops (i.e., 1 hop) to Remote WTRU1 201 to complete the DL transmission.

Figure 4:
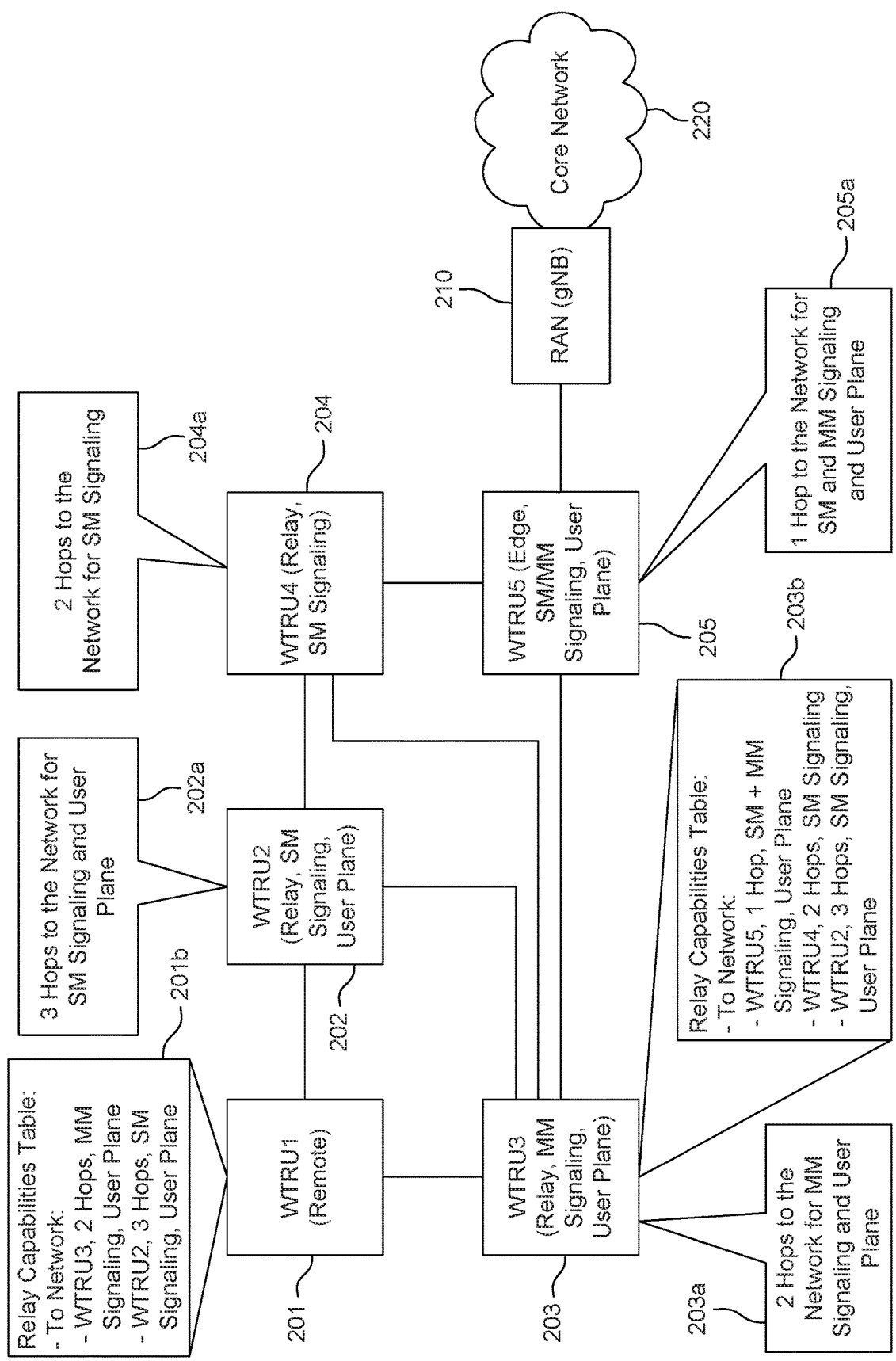
FIG. 4 is a system diagram illustrating an example of a hops to network in the uplink (UL) direction.

FIG. 4 is a diagram illustrating an example advertisement for the UL direction and includes example relay capabilities tables for Remote WTRU1 201 and Relay WTRU3 203. Each WTRU (Relay, Remote, edge, etc.) determines how many hops it is located from the network by receiving the advertisements of each other WTRU, as illustrated in FIG. 4. As shown, the Edge WTRU5 205 and the Relay WTRUs each advertise their capabilities and number of hops in the UL direction. Advertisement 205*a* from Edge WTRU5 205 indicates that Edge WTRU5 205 is 1 hop to the network for SM signaling, MM signaling, and user plane data. Advertisement 202*a* from Relay WTRU2 202 indicates that Relay WTRU2 202 is 3 hops to the network for SM signaling and user plane. Advertisement 203*a* from Relay WTRU3 203 indicates that Relay WTRU3 203 is 2 hops to the network for MM signaling and user plane data. Advertisement 204*a* from Relay WTRU4 204 indicates that Relay WTRU4 204 is 2 hops to the network for SM signaling.

Additionally, for example, as shown in FIG. 4, Relay WTRU3 203 generates a relay capabilities table 203*b* based on advertisements received from Edge WTRU5 205, Relay WTRU4 204, and Relay WTRU2 202. The relay capabilities table 203*b* includes hops to the network for each given Relay WTRU that provides an advertisement received by WTRU3 203. As shown, the relay capabilities table 203*b* includes Edge WTRU5 205 capabilities SM, MM, and user plane data and 1 hop to the network, Relay WTRU4 capability of SM signaling and 2 hops to the network, and Relay WTRU2 capabilities SM signaling and user plane data and 3 hops to the network. Further, Remote WTRU1 201 generates a relay capability table 201*b* based on advertisements provided from Relay WTRU2 202, and Relay WTRU3 203. As shown, the relay capabilities table 201*b* includes Relay WTRU3 203 capabilities MM signaling, and user plane and 2 hop to the network, and Relay WTRU2 capabilities SM signaling and user plane data and 3 hops to the network.

Although relay capability tables are shown for Remote WTRU1 201 and Relay WTRU3 203, it will be understood that each Relay WTRU may generate a relay capability table to reach the network. Accordingly, traffic from WTRU1 may be sent toward the network based on each generated relay capability table.

Similarly, traffic in the DL direction (i.e., toward Remote WTRU1 201) also needs to be relayed in the mesh network of WTRUs, indicating that Remote WTRU1 is reachable via the mesh network. Such a DL relay capabilities table may also include the type of traffic and via how many hops it would take a packet, from a given Relay WTRU, to reach the Remote WTRU1 201.

Figure 5:
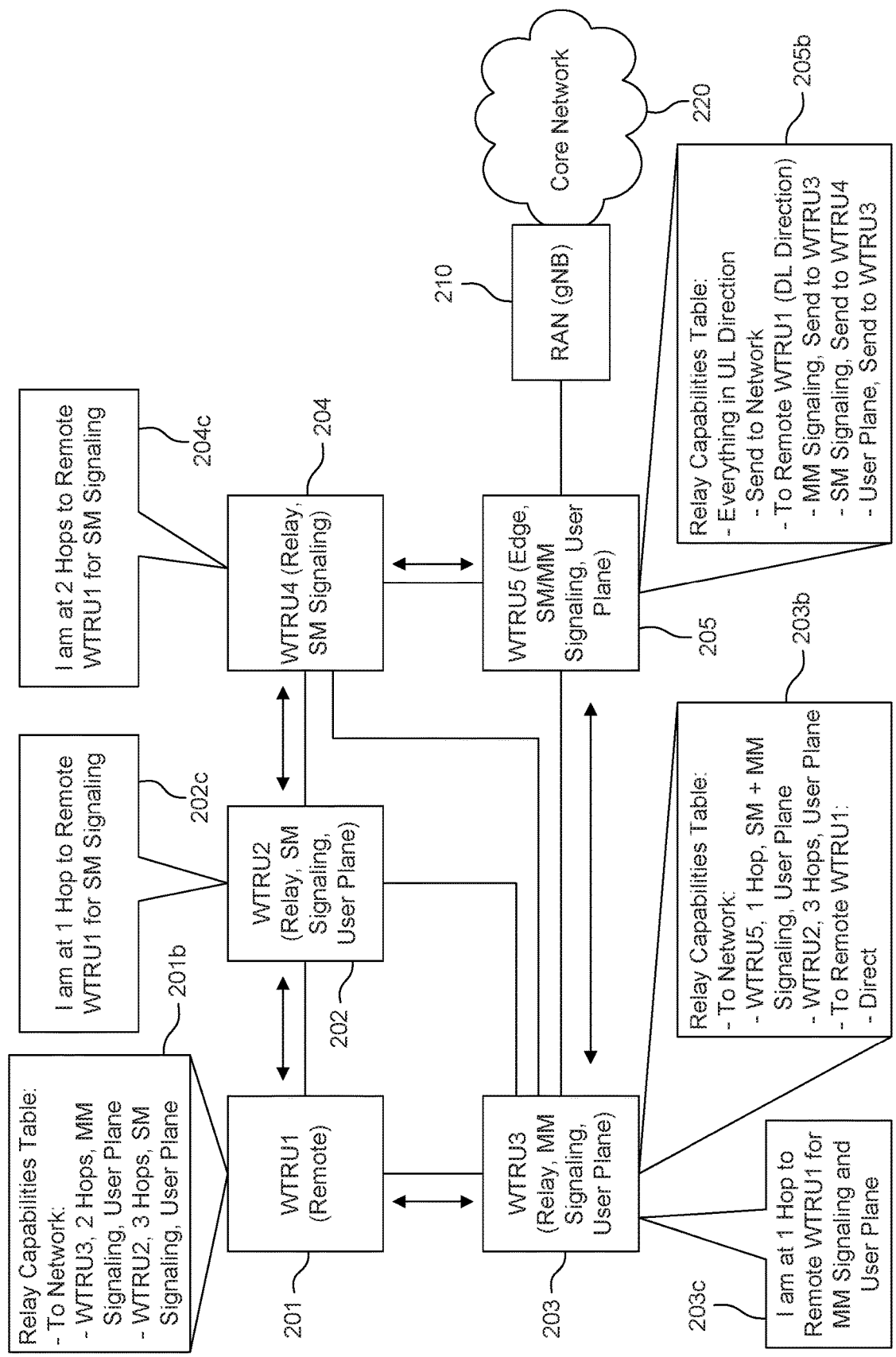
FIG. 5 is a system diagram illustrating an example of a hops to network in the downlink (DL) direction.

FIG. 5 is a diagram illustrating example Relay WTRU advertisements for the DL direction and example DL relay capabilities tables. In this example, Relay WTRU2 202, Relay WTRU3 203, and Relay WTRU4 204 advertise the number of hops to Remote WTRU1 201 and the traffic type that they support. Edge WTRU5 205 and other Relay WTRUs receiving this information update their DL relay capabilities table to identify to which next hop or Relay WTRU traffic for Remote WTRU1 should be sent, depending on the traffic type. Relay WTRUs receiving the DL advertisements, in addition to updating their local DL relay capabilities table, also transmit advertisements indicating that a path to reach Remote WTRU1 201 is identified with the number of hops increased by one, for the traffic type that they support. For example, WTRU4 204 receives possible advertisements from Relay WTRU2 202 and Relay WTRU3 203. Relay WTRU4 204 updates its relay capabilities table and sends an advertisement indicating that Remote WTRU1 for SM signaling can be reached with two hops distance.

As shown in FIG. 5, Advertisement 202*c* from Relay WTRU2 202 indicates that Relay WTRU2 202 is 1 hop to the Remote WTRU1 201 for SM and user plane data. Advertisement 203*c* from Relay WTRU3 203 indicates that Relay WTRU3 203 is 1 hop to the Remote WTRU1 201 for MM and user plane signaling. Advertisement 204*c* from Relay WTRU4 204 indicates that Relay WTRU4 204 is 2 hops to the Remote WTRU1 201 for SM signaling.

Additionally, for example, as shown in FIG. 5, Relay WTRU3 203 updates its relay capabilities table 203*d* to indicate that it is directly connected to the Remote WTRU1 201. The relay capabilities table 201*b* for Remote WTRU1 201 may remain the same as DL capabilities for the mesh network may not be necessary for the Remote WTRU1 201 to store. Edge WTRU5 205 updates its relay capacities table to include the quickest transmission to the Remote WTRU1 201 per traffic type (i.e., MM signaling to be transmitted via Relay WTRU3 203, SM signaling to be transmitted via Relay WTRU4 204, and user plane data to Relay WTRU3 203) in addition to its UL capabilities (i.e., to transmit all UL traffic to core network 220 via RAN (gNB) 210).

Since all WTRUs in a given mesh network do not necessarily handle the forwarding of all traffic types, each WTRU advertises the number of hops per traffic type, for the DL and UL directions. For example, in some embodiments, a Relay WTRU may forward MM signaling toward the Remote WTRU via a path with two hops, while SM signaling may be sent via another path with three hops.

According to an embodiment, a relay capabilities table may include traffic type, number of hops, Relay identifier, Relay role, QoS parameters, load, etc., for the UL direction. A relay capabilities table may include a Remote WTRU identifier, traffic type, number of hops, Relay identifier, role, QoS parameters, load, etc., for the DL direction. QoS parameter values are further disclosed herein. A load may be a value received on the advertisements of the specific Relay WTRU. As an example, in reference to FIG. 4 and FIG. 5, the Relay WTRU3 203 relay capabilities tables for the UL direction may be [MM signaling, 1 hop, Relay WTRU5, Edge, etc.] and [user plane, 1 hop, WTRU5, Edge, etc.]. The Relay WTRU3 203 relay capabilities table for the DL direction may be [Remote WTRU1, MM signaling, Remote (i.e., directly connected to Remote WTRU going out of mesh network)]. The Edge WTRU5 205 relay capabilities table for the UL direction may be [Edge WTRU forward all traffic toward network (out of mesh network)]. The Edge WTRU5 205 relay capabilities tables for the DL direction may be [Remote WTRU1, MM signaling, 1 hop, WTRU3, Relay, etc.], [Remote WTRU1, SM signaling, 2 hops, WTRU4, Relay, etc.], and [Remote WTRU1, user plane, 1 hop, WTRU3, Relay, etc.]. The Relay WTRU4 204 relay capabilities table for the UL direction may be [SM signaling, 1 hop, WTRU5, Edge (i.e., directly connected to Edge WTRU), etc.]. The Relay WTRU4 204 relay capabilities table for the DL direction may be [Remote WTRU1, SM signaling, 1 hop, WTRU2, Relay, etc.].

The mesh network of Relay WTRUs may be dynamic (i.e., WTRUs may come and leave the network). Accordingly, the advertisements from Relay WTRUs may be sent frequently and the local relay capabilities table of each recipient WTRU may be updated accordingly. Path, or next relay WTRU, selection may be based on a per packet basis, based on the information from a given relay capabilities table when the packet needs to be inserted or relayed into the mesh network of WTRUs.

One-to-one connections (e.g., ProSe) may be established between a Remote WTRU (e.g., Remote WTRU1 201 of FIG. 2) and a Relay WTRU, providing access to the mesh network of WTRUs and between the Relay WTRUs in the path up to the Edge WTRU (e.g., Edge WTRU5 205 of FIG. 2).

For example, in some embodiments, the Remote WTRU (e.g., Remote WTRU1 201 of FIG. 2) may establish a communication with a remote peer. Accordingly, a session may need to be established with the network (e.g., PDU session) and traffic may need to be sent by the Remote WTRU (e.g., Remote WTRU1 201 of FIG. 2). Accordingly, the Remote WTRU may reference its relay capabilities table and select the WTRU to relay its traffic to the network based on the traffic type, the number of hops, the QoS, etc. Different WTRUs may be selected to carry different traffic types (e.g., depending on the capabilities of each Relay WTRU). Therefore, many one-to-one communications may need to be established by the Remote WTRU.

Once a next hop is selected, a one-to-one communication is established, if none already exist between two respective WTRUs. This one-to-one communication (e.g. PC5 unicast) from a Remote WTRU to a Relay WTRU represents the first segment of the relay path to the network. The selected Relay WTRU advertises its capabilities in relation to the Remote WTRU and/or the network including, but not limited to, the number of hops, the traffic type, QoS, etc.

The selected Relay WTRU repeats the same or similar logic as the Remote WTRU (e.g., it applies the traffic type for the established communication and utilizes its local relay capabilities table to determine the next Relay WTRU in the path, in the UL direction). Once the next Relay WTRU is identified, a one-to-one communication is established with the identified Relay WTRU (if none already exists). This process is repeated on every Relay WTRU until communication is established with the Edge WTRU.

A one-to-one communication between two Relay WTRUs or between a Relay WTRU and an Edge WTRU may be used to send traffic of different data types and from different WTRUs.

Each Relay WTRU that receives an advertisement related to the Remote WTRU updates its local relay capabilities table and advertises its capabilities to reach the Remote WTRU and/or the network, the adjusted number of hops, the traffic type that it supports, QoS, etc. Each WTRU (Relay and Edge) identifies how many hops it is located from the Remote WTRU by listening to the advertisements of relay WTRUs and adding one to the number of hops in the received advertisement.

According to an embodiment, the Edge WTRU may not advertise DL information, as it is used for relays when forwarding traffic in the UL direction. The Edge WTRU may forward data received from any of its one-to-one communication (i.e., any Relay WTRU) to the network.

When DL traffic for a Remote WTRU is received at the Edge WTRU, it references its relay capabilities table, and selects the Relay WTRU that can reach this Remote WTRU based on the traffic type, number of hops, QoS, etc. This process is repeated by every Relay WTRU that receives data for the Remote WTRU until it reaches the Relay WTRU which is directly connected to the Remote WTRU. Data is then forwarded to the Remote WTRU.

Figure 6:
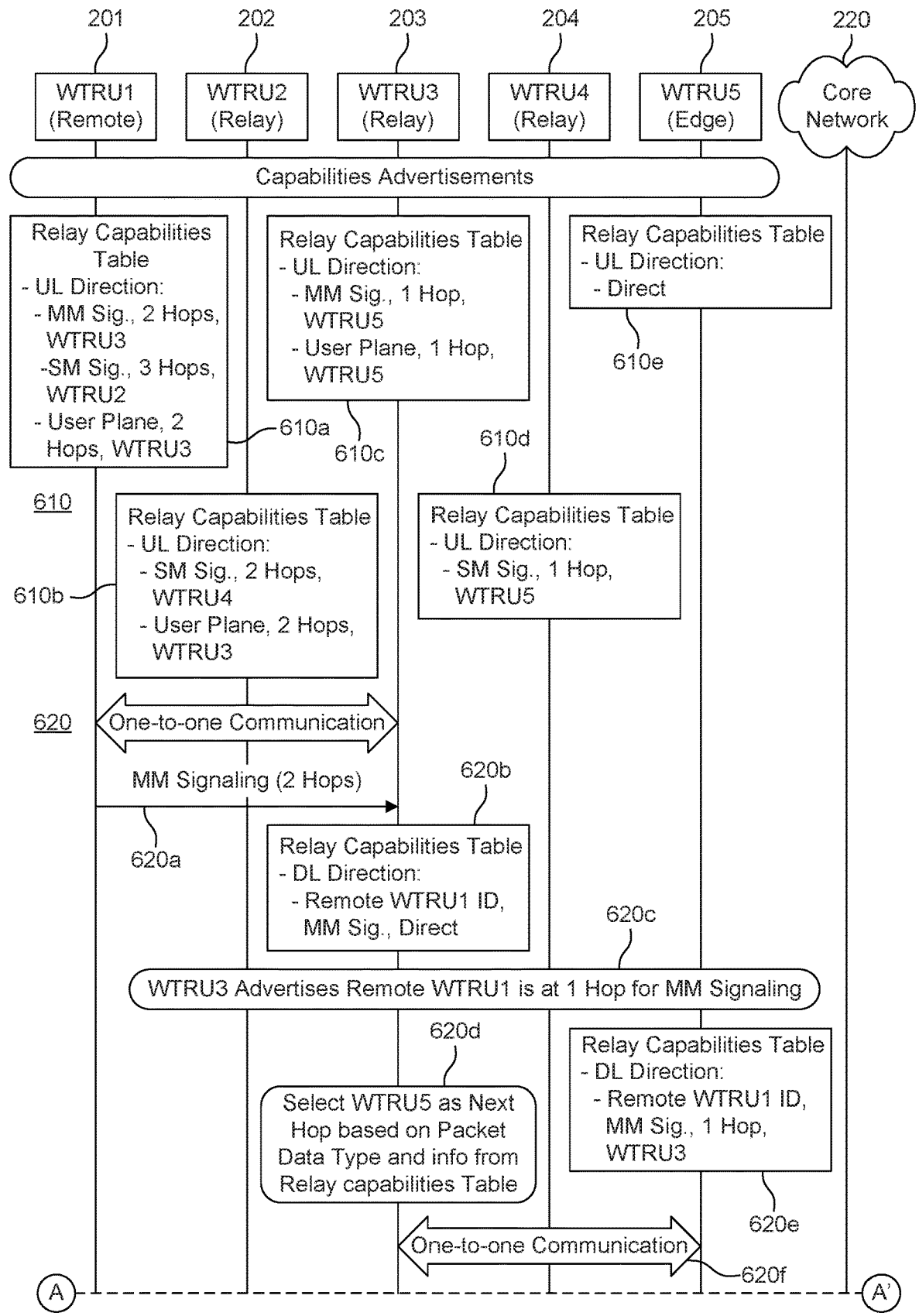
FIG. 6 is a diagram illustrating an example method for one-to-one communication establishment and traffic forwarding.
Figure 6:
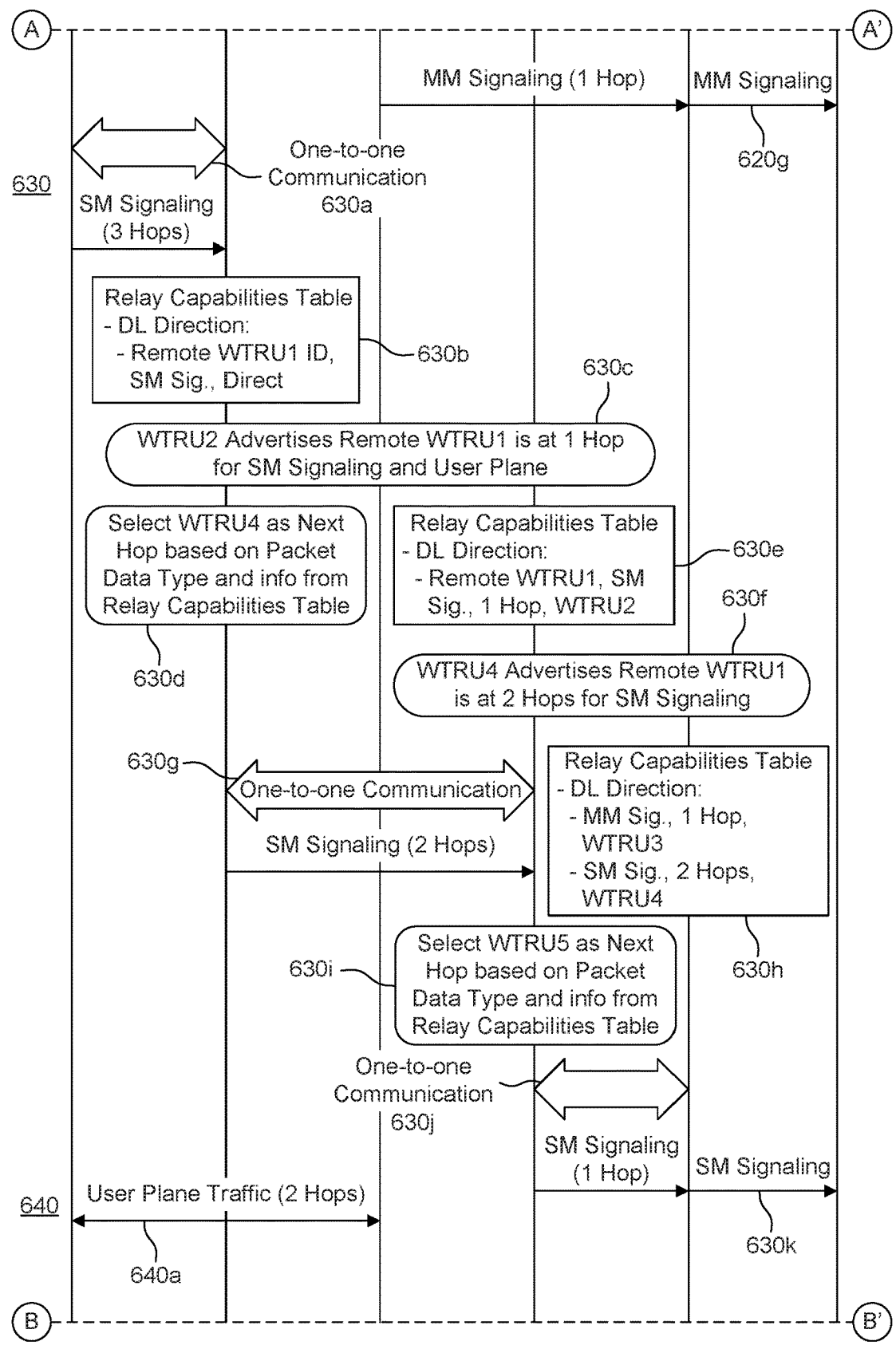
Figure 6:
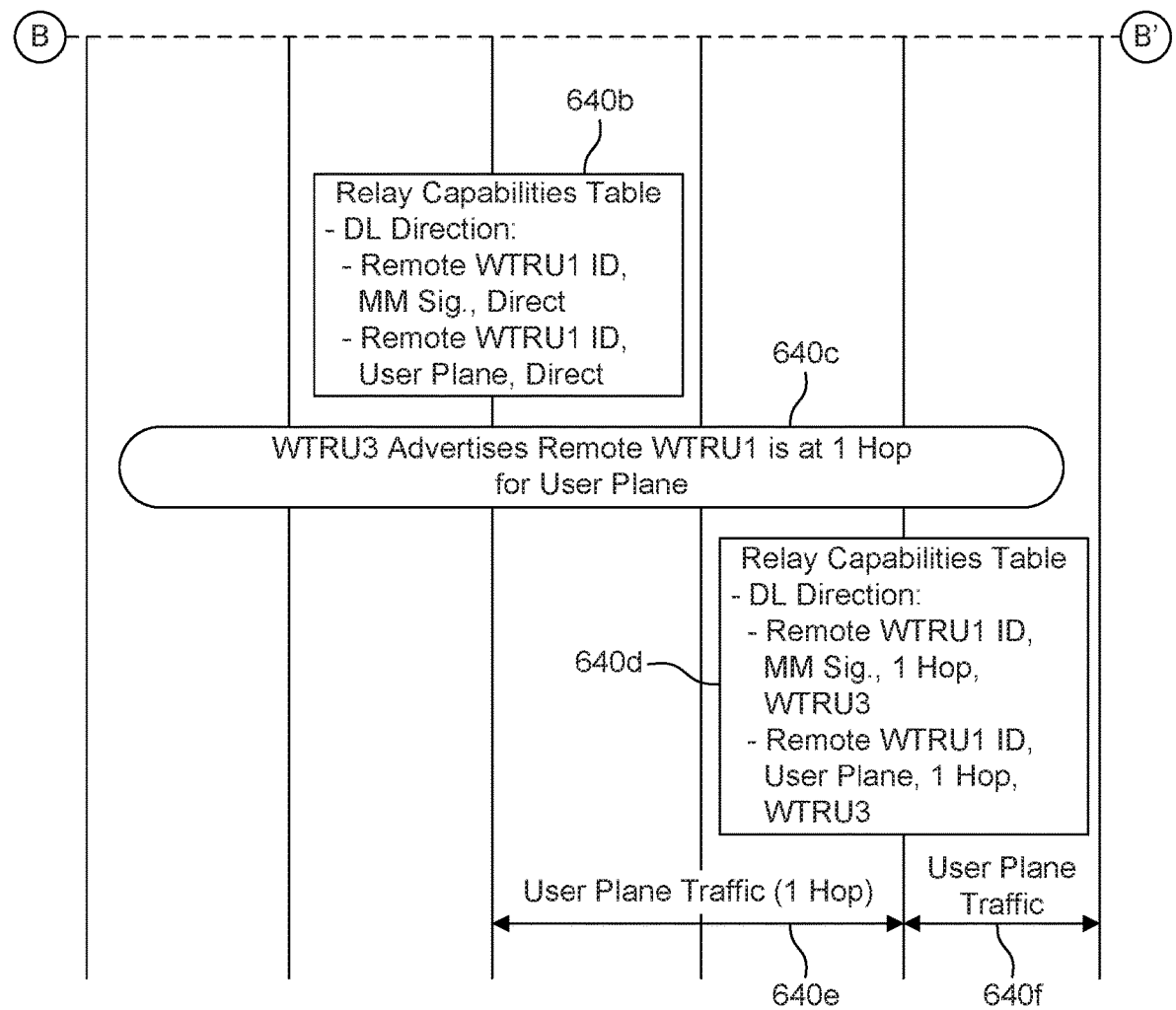

As illustrated in FIG. 6, which references the mesh network of FIGS. 4 and 5, at 610, all Relay WTRUs advertise their capabilities (e.g., MM signaling relay, SM signaling relay, user plane relay) and a local relay capabilities table for the UL direction is built on every WTRU (including Remote WTRU(s), and Relay WTRU), based on received announcements, as illustrated in FIG. 4. The Edge WTRU5 205 is directly connected to the network (e.g., via a gNB). Notably, at 610, when all Relay WTRUs advertise their capabilities, Remote WTRU1 201 generates or updates its relay capabilities table in the UL direction to include MM signaling with 2 hops via Relay WTRU3 203, SM signaling with 3 hops via Relay WTRU2 202, and user plane with 2 hops via Relay WTRU3 203. Relay WTRU2 202 generates or updates its relay capabilities table in the UL direction to include SM signaling with 2 hops via Relay WTRU4 204, and user plane data with 2 hops via Relay WTRU3 203. Relay WTRU3 203 generates or updates its relay capabilities table in the UL direction to include MM signaling with 1 hop via Edge WTRU5 205, and user plane with 1 hop via Edge WTRU5 205. Relay WTRU4 204 generates or updates its relay capabilities table in the UL direction to include SM signaling with 1 hop via Edge WTRU5 205. Relay WTRU5 205 generates or updates its relay capabilities table in the UL direction to direct transmission to the core network 220.

At 620, the Remote WTRU1 201 may have MM signaling traffic that it needs to transmit. The Remote WTRU1 201 may select the path for MM signaling traffic based on its local relay capabilities table updated at 610*a*. According to the example provided in FIG. 6, Relay WTRU3 203 is selected for MM signaling traffic. If no one-to-one connection exists between Remote WTRU1 201 and Relay WTRU3 203, one-to-one connection establishment is triggered at 620*a*. If a one-to-one connection exists between Remote WTRU1 201 and Relay WTRU3 203, then the one-to-one connection is used for the transmission from Remote WTRU1 201 to Relay WTRU3 203 at 620*a*.

According to embodiments, Relay WTRU3 203 may determine that a one-to-one connection toward the Edge WTRU5 205 is needed. If no one-to-one connection exists at a given point, the Relay WTRU3 203 may trigger establishing a one-to-one connection with Edge WTRU5 205, at 620*f*, based on information from its local relay capabilities table. The DL path toward WTRU1 may be established from Edge WTRU5 205 to Relay WTRU3 203 to Remote WTRU1 201 using the same mechanism (i.e., using the relay capabilities table and establishing one-to-one communications). Based on the UL and DL paths, MM signaling traffic may be exchanged in UL and DL directions.

As shown in FIG. 6, Remote WTRU1 201 may send MM signaling traffic to Relay WTRU3 203 at 620*a*. The MM signaling traffic includes at least one packet that includes the allowed number of hops, the direction (UL in this example), Remote WTRU1 201'*s* identifier for signaling (e.g., SUCI, 5G-GUTI or Permanent Equipment Identifier (PEI) or another ProSe ID) and may include other parameters (e.g., QoS parameters). Relay WTRU3 203 receives the packet, extracts Remote WTRU1 201'*s* identifier associated with signaling traffic, and advertises that it may reach Remote WTRU1 201 for MM signaling traffic type at one hop at 620*c*. Edge WTRU5 205 receives this advertisement and updates its Relay capabilities table in the DL direction at 620*e*. Relay WTRU3 203 checks if the received packet is for the DL direction or the UL direction, based on the information contained in the packet (e.g., the packet header), and number of hops allowed. Based on the packet being received at Relay WTRU3 203, one hop is subtracted from the number of hops allowed and the packet is updated with the new value for the number of hops. Relay WTRU3 203 searches for Edge WTRU5 205 to forward the received packet at 620*d* given that the transmission is a UL packet. Note that Relay WTRU3 203 would search for Remote WTRU1 201 if the transmission included a DL packet. A one-to-one connection is established between Relay WTRU3 to Edge WTRU5 205, at 620*f*, if none exists. MM signaling traffic may be exchanged in both directions (UL and DL) at 620*g*.

As shown in FIG. 6, Remote WTRU1 201 may send SM signaling traffic at 630. As shown in FIG. 6, Remote WTRU1 201 may select the path for the SM signaling traffic based on its local relay capabilities table at 630*b* (i.e., it selects Relay WTRU2 202 as the Relay WTRU). One-to-one communications are established between Remote WTRU1 201 and Relay WTRU2 202 at 630*a*, Relay WTRU2 2020 and Relay WTRU4 204 at 630*g*, and Relay WTRU4 204 and Edge WTRU5 205 at 630*j*. Relay WTRU2 202 receives the packet, extracts Remote WTRU1 201'*s* identifier association with signaling traffic, and advertises that it can reach Remote WTRU1 201 for SM signaling and number of hops (i.e., 1) at 630*c*. Relay WTRU4 204 receives the advertisement from Relay WTRU2 202 and advertises that it may reach Remote WTRU1 201 for SM signaling with the number of hops advertised by Relay WTRU2 202, increased by one, at 630*f*. SM signaling traffic may be exchanged in both directions (UL and DL) based on the updated relay capabilities tables, updated based on the advertisements.

Remote WTRU1 201 sends SM signaling traffic to Relay WTRU2 202 at 630*a*. The packet includes: the allowed number of hops (i.e., 3 hops in this example), the direction (i.e., UL in this example), and Remote WTRU1 201'*s* identifier for signaling. The packet may include other parameters (e.g., QoS parameters). Relay WTRU2 202 determines the packet direction to determine if the transmission is in the DL direction or the UL direction (based on information contained in the packet). Relay WTRU2 202 also determines the number of hops allowed based on packet information and subtracts one hop (i.e., resulting in 2 hops in this example). The Relay WTRU2 searches for Edge WTRU5 205 to forward the received data since it is a UL packet. WTRU2 searches for the Remote WTRU1 if it is a DL packet.

Since the Relay WTRU2 202 is not connected to Edge WTRU5 205, it determines the next hop (i.e., Relay WTRU4 204 at 630*d*) using its local relay capabilities table at 630*b*, based on the received data type (i.e., MM signaling, SM signaling, or user plane data) and broadcasts the capabilities of Relay WTRUs at 630*c*.

Relay WTRU2 202 forwards the data to the next hop at 630*g* if the number of hops is greater than one, as shown in FIG. 6. Otherwise, WTRU2 202 discards the packet.

Relay WTRU4 204 receives the packet and repeats the same logic as Relay WTRU2 202 to find Edge WTRU5 205 by referring to its local relay capabilities table and the packet's direction and data type at 630*i*. Relay WTRU4 204 also checks the number of hops allowed, subtracts one, and updates the packet before forwarding it to the Edge WTRU5 205 at 630*k*.

At 640, user plane traffic may be sent by the Remote WTRU1 201 using the one-to-one connection that has been established for MM signaling based on relay capabilities information, at 620*a*. The packet may include: the allowed number of hops (i.e., 2 hops in this case), the direction (i.e., UL in this case), Remote WTRU1 201'*s* identifier for user plane (e.g., IP address) and may include other parameters (e.g., QoS parameters). Relay WTRU3 203 may receive the packet, extract Remote WTRU1 201'*s* identifier associated with user plane traffic, update its relay capabilities table at 640*b* and advertise that it may reach Remote WTRU1 for user plane traffic type and that it is at one hop, at 640*c*. Edge WTRU5 205 may receive the advertisement and update its relay capabilities table in the DL direction at 640*d*. User plane traffic may be exchanged in both directions (UL and DL) at 640*e* and 640*f*.

The traffic path (e.g., next Relay WTRU selection) is based on the number of hops to the network or to a Remote WTRU and also based on the traffic type. The application ID/types may also be considered when determining the traffic path. The shortest path can be selected based on these factors. Further, other information may be considered. For example, the load on a WTRU, which may delay the traffic forwarding or the QoS (e.g., latency). Therefore, a path with a higher number of hops may end being selected based on one or more factors.

To determine a next hop relay, the potential next hop relay needs to support the given type of traffic to be transmitted. Similarly, the type of traffic needs to be supported by an entire traffic path's chain of WTRUs represented by the number of hops advertised for the given traffic type.

Accordingly, a given WTRU seeking to transmit traffic utilizes its relay capabilities table for the Remote WTRU or Edge WTRU, depending on the traffic direction (i.e., UL or DL). If the Relay WTRU is not connected to the Edge WTRU or the Remote WTRU, it selects the next Relay WTRU to transmit the packet. Path selection (e.g., the next Relay WTRU selection) is determined based on the selected Relay WTRU supporting the packet's traffic type, its capability of reaching the Edge WTRU (in the UL direction) or Remote WTRU (in the DL direction), and that the number of hops advertised by the selected next Relay WTRU is smaller or equal to the allowed number of hops specified in the packet.

With reference to FIG. 5, Edge WTRU5 205 receives traffic (packets) in the DL direction from the network. Edge WTRU5 205 searches for the Remote WTRU1 201 identifier in its relay capabilities table for the next Relay WTRU selection. The Remote WTRU1 201 identifier is specified in the received packet (e.g., packet header). If multiple paths toward the identified Remote WTRU1 201 exist, the next Relay WTRU selection is done as specified herein, i.e., consider the traffic type, number of hops, load, QoS, etc.

For example, Relay WTRU3 203 may receive traffic in the UL direction. Relay WTRU3 203 then may search for the Edge WTRU5 205 in its relay capabilities table. If no entry specifies a direct connection with Edge WTRU5 205, then the selection is performed as specified above (i.e., a Relay WTRU based path)

A Relay WTRU may receive traffic data to be forwarded (i.e., traffic data corresponding to its capabilities) via a one-to-one communication. A one-to-one communication (e.g., ProSe) is established between Relay WTRUs for traffic forwarding. A received packet may include information required by the Relay WTRU to determine where to forward the packet. For example the packet may include: the allowed number of hops to reach the network or the Remote WTRU; the traffic type (MM signaling, SM signaling, or user plane data), the forwarding direction (UL or DL); and the Remote WTRU identifier.

A given Relay WTRU may check if a given packet is for the UL or DL direction and may search for the Edge WTRU if it is an UL packet and searches for a Remote WTRU if it is a DL packet.

If the given Relay WTRU is not connected to the Edge WTRU or the Remote WTRU (i.e., one hop away from the Edge WTRU or Remote WTRU), the Relay WTRU searches in its relay capabilities table for the next Relay WTRU to forward the received data. This next Relay WTRU is determined based on the packet's traffic type, broadcasted capabilities of next hop Relay WTRU, forwarding direction, and hop count specified in the packet compared to hops associated to the next hop relay WTRU.

The Relay WTRU checks the number of hops allowed, subtracts one hop, and updates the packet with the new number of hops before forwarding the packet to the selected Relay WTRU (i.e., the next hop). For the UL and DL directions, the Relay WTRU forwards the data to the next hop if the number of hops is greater than one. Otherwise, the Relay WTRU discards the packet.

The Edge WTRU (in the DL direction) and the Remote WTRU (in the UL direction) insert the packet into the mesh networks of WTRUs. The packet is modified to include the required fields for forwarding, for example, the allowed number of hops, traffic type, direction, Remote WTRU identifier, time, etc.

The Remote WTRU inserts its identifier based on the traffic type. For example, the user plane traffic type may be identified using an IP address while signaling may be identified using a SUCI. The Edge WTRU receiving traffic for the DL direction (i.e., from the network) also inserts the remote WTRU identifier based on the traffic type. The Edge WTRU determines the Remote WTRU identifier based on information included in the packet. In some embodiments, the Remote WTRU identifier is a destination IP address when user plane traffic is received and a SUCI when SM or MM signaling is received.

The maximum number of hops is provisioned on the WTRUs but may be modified by each WTRU based on measurements or observations. According to an embodiment, packets introduced into the mesh network may contain an allowed time. Accordingly, the Edge WTRU and last Relay WTRUs in the mesh network may apply the allowed time to measure the time it takes for the packets to traverse the mesh network. The WTRU may then map the traffic type, QoS parameters, and observed forwarding time to a maximum number of hops. A Relay WTRU or Edge WTRU may increase (if traversal is fast) or decrease (if traversal is long) the maximum number of hops into packets inserted into the mesh network. Alternatively, the WTRU may select another Relay WTRU as the next hop if the transfer time is too long. For example, instead of decreasing the number of hops, the WTRU may test if the traversal time is better.

Figure 7A:
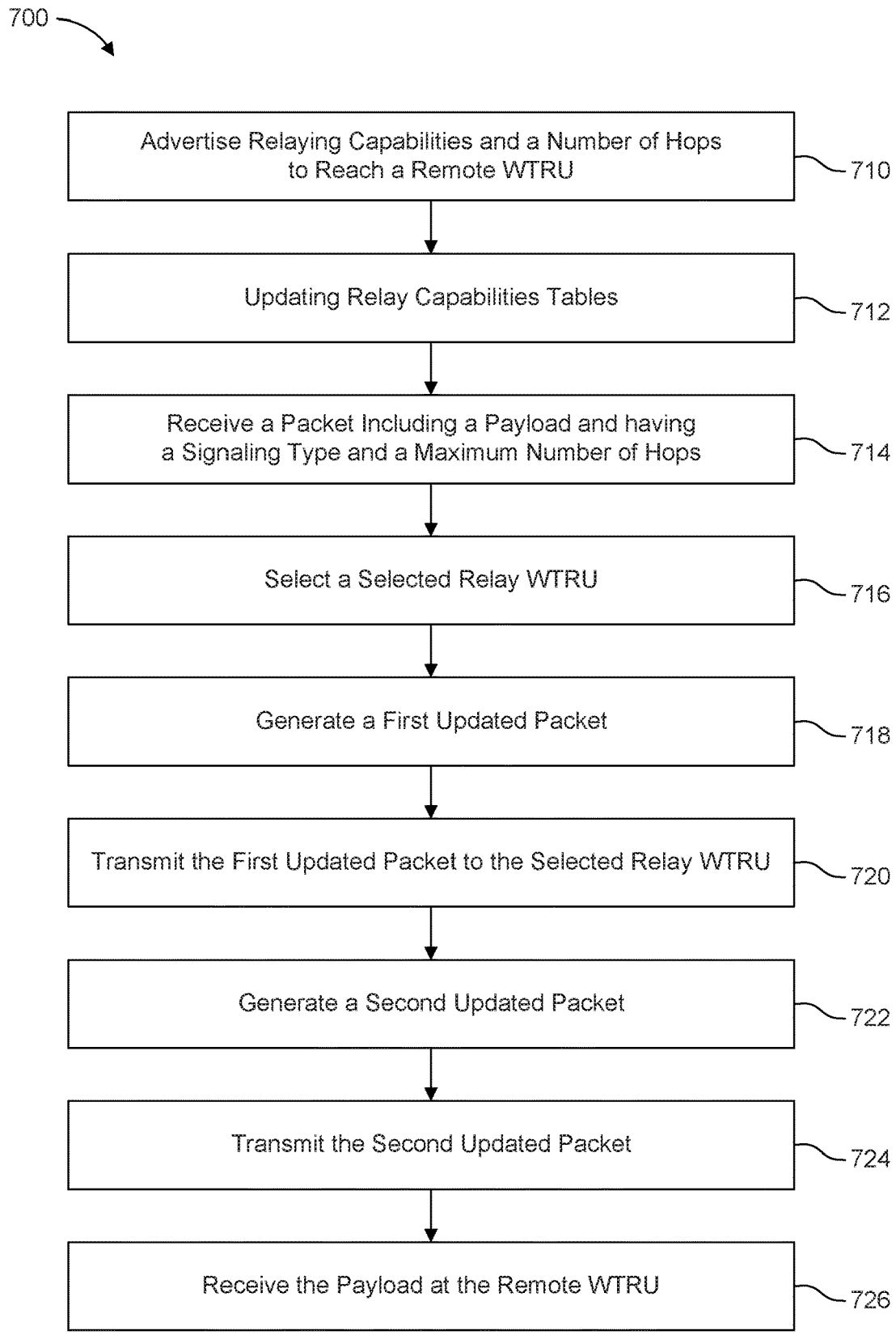
FIG. 7A is a flowchart illustrating DL transmissions in a multi-hop mesh network.

FIG. 7A shows a flowchart 700 for a DL transmission of a packet from a core network to a remote WTRU in accordance with the subject matter disclosed herein. The remote WTRU may be out of coverage from the core network such that a transmission from the core network may not be received at the remote WTRU without multiple hop relays through multiple Relay WTRUs. At 710, each relay WTRU of a plurality of relay WTRUs in a mesh network may advertise its relaying capabilities and a number of hops to reach a remote WTRU. For example, as illustrated in FIG. 5, each Relay WTRUs 202-205 may advertise its relay capability (e.g., MM signaling, SM signaling, user plane data, etc.) and the number of hops that the given Relay WTRU is from a remote WTRU (e.g., Relay WTRU3 203 may advertise its MM and User Plane data capabilities as well as that it is 1 hop from the Remote WTRU1 201).

At 712 of flowchart 700, an edge WTRU (e.g., Edge WTRU5 205 of FIG. 5) connected to a core network (e.g., core network 220 of FIG. 5) may update its edge WTRU relay capabilities table and each of a plurality of Relay WTRUs (e.g., Relay WTRUs 202-205 of FIG. 5) may update their respective Relay WTRU relay capabilities table. The updates to the Edge WTRU relay capabilities table and the Relay WTRU relay capabilities tables may be made based on the advertisements made at 710 such that each Relay WTRU of the plurality of Relay WTRUs may update its respective relay capabilities table based on the advertisements by each other of the plurality of relay WTRUs in the mesh network.

At 714 of flowchart 700, a packet including a payload may be received at the edge WTRU. The packet may be received from the core network and may have a traffic type (e.g., MM signaling, SM signaling, user plane data, etc.) associated with the packet. Additionally, the packet may include a maximum number of hops which may be determined based on an attribute of the packet such as priority, QoS requirement(s), time period of relevancy, or the like. The packet may also include a Remote WTRU identifier that identifies the intended recipient of the payload.

At 716 of flowchart 700, a selected Relay WTRU may be selected from the plurality of Relay WTRUs. The selected Relay WTRU may be selected based on a signaling capability of selected WTRU matching the traffic type of the packet received at 714, the maximum number of hops associated with the packet received at 714, and on the Edge WTRU relay capabilities table (e.g., the Edge WTRU relay capabilities table may include information about the selected Relay WTRU that corresponds to its signaling capabilities as well its number of hops to a Remote WTRU). Notably, the selected Relay WTRU may be selected based on the number of hops to reach the remote WTRU from the selected Relay WTRU being less than the first updated number of hops, as disclosed at step 718.

At 718 of flowchart 700, a first updated packet may be generated based on the packet received at 714. The first updated packet may include the payload from the packet received at 714 and may have a direction, traffic type and an updated number of hops that is one less than the maximum number of hops. Notably, the first updated packet may have an updated header that has a revised maximum number of hops (i.e., revised to the first number of hops which is one less than the maximum number of hops). To clarify, the first number of hops may incorporate the hop from the Edge WTRU to the selected Relay WTRU. The first updated packet generated at 718 may be generated at the Edge WTRU and/or the selected Relay WTRU such that it may be generated prior to being transmitted by the Edge WTRU and/or after being transmitted by the Edge WTRU.

At 720 of flowchart 700, the first updated packet may be transmitted by the Edge WTRU. The first updated packet may be received by the selected Relay WTRU via connection such as a one-to-one connection between the Edge WTRU and the selected Relay WTRU. At 722 of flowchart 700, a second updated packet may be generated. The second updated packet may include the payload, a direction and traffic type from the packet received at 714 but may have a updated number of hops that is one less than the first number of hops. Notably, the second updated packet may have an updated header that has a revised maximum number of hops (i.e., revised to the second number of hops which is one less than the first number of hops). To clarify, the second number of hops may incorporate the hop from the selected Relay WTRU to a subsequent selected Relay WTRU. The second updated packet generated at 722 may be generated at the selected Relay WTRU and/or a subsequent selected Relay WTRU such that it may be generated prior to being transmitted by the selected Relay WTRU and/or after being transmitted by the selected Relay WTRU.

At 724 of flowchart 700, the second updated packet may be transmitted based on the traffic type, the second updated number of hops, and/or a selected WTRU relay capabilities table in a manner similar to the transmission of the first updated packet to the selected Relay WTRU at 720. The second updated packet may be received by a subsequent Relay WTRU if one or more additional hops is required such that each additional hop may result in an updated packet that includes the payload from the packet received at 714. At 726 of flowchart 700, the payload from the packet received at 714 may be received at the remote WTRU, completing the DL transmission from the core network to the remote WTRU.

Figure 7B:
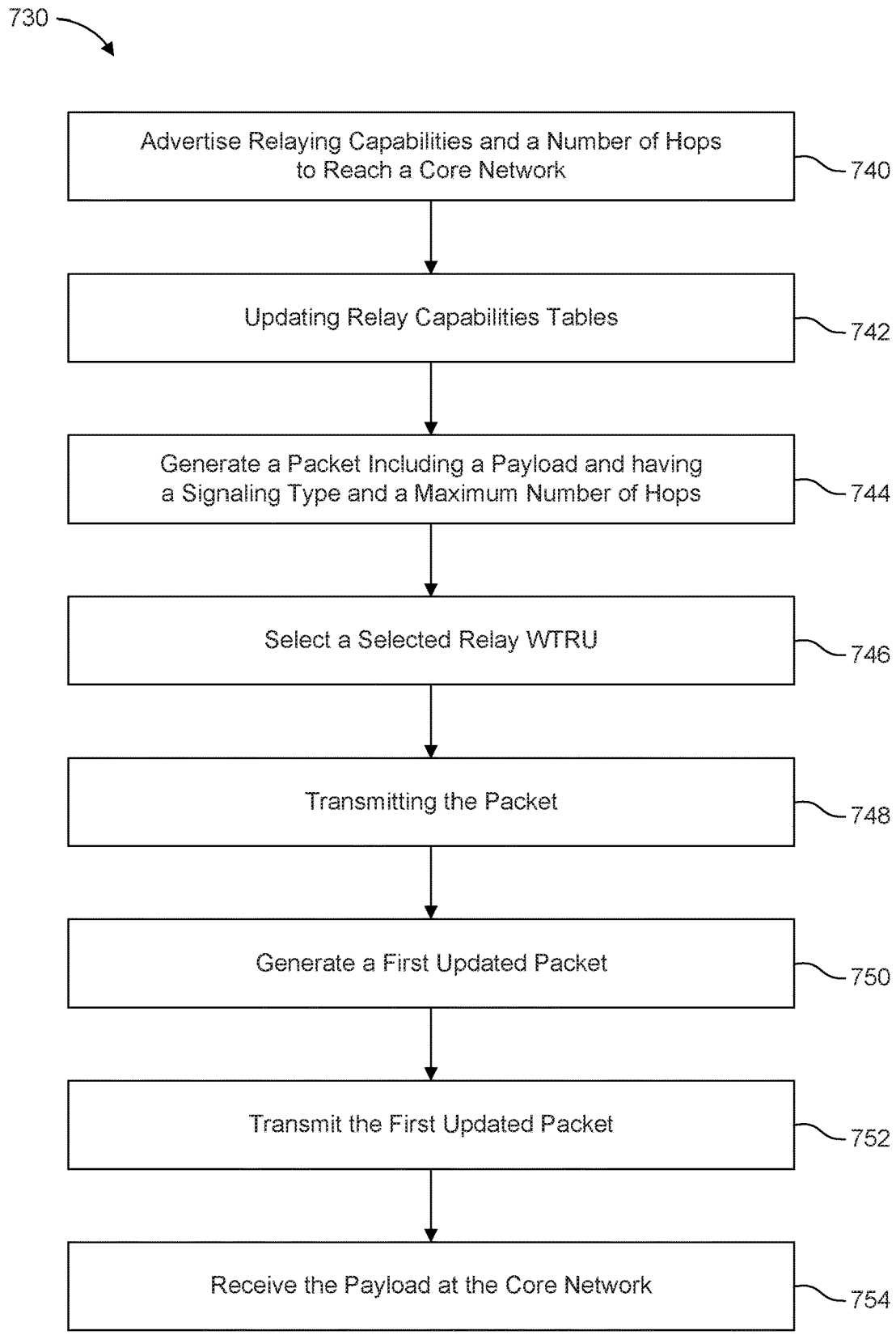
FIG. 7B is a flowchart illustrating UL transmissions in a multi-hop mesh network.

FIG. 7B shows a flowchart 730 for an UL transmission of a packet from a Remote WTRU to a core network in accordance with the subject matter disclosed herein. The Remote WTRU may be out of coverage from the core network such that a UL transmission from the Remote WTRU may not be received at the core network without multiple hop relays through multiple Relay WTRUs. At 740, each relay WTRU of a plurality of relay WTRUs in a mesh network may advertise its relaying capabilities and a number of hops to reach the core network. For example, as illustrated in FIG. 4, each Relay WTRUs 202-205 may advertise its relay capability (e.g., MM signaling, SM signaling, user plane data, etc.) and the number of hops that the given Relay WTRU is from a remote WTRU (e.g., Relay WTRU3 203 may advertise its MM signaling and User Plane data capabilities as well as that it is 2 hops from the core network).

At 742 of flowchart 730, the Remote WTRU (e.g., Remote WTRU1 201 of FIG. 4) may update its Remote WTRU relay capabilities table and each of a plurality of Relay WTRUs (e.g., Relay WTRUs 202-205 of FIG. 4) may update their respective Relay WTRU relay capabilities table. The updates to the Remote WTRU relay capabilities table and the Relay WTRU relay capabilities tables may be made based on the advertisements made at 740 such that the Remote WTRU and each Relay WTRU of the plurality of Relay WTRUs may update its respective relay capabilities table based on the advertisements by each other of the plurality of relay WTRUs in the mesh network.

At 744 of flowchart 730, a packet including a payload may be generated by the Remote WTRU. The packet may have a traffic type (e.g., MM signaling, SM signaling, user plane data, etc.) associated with the packet and direction. Additionally, the packet may include a maximum number of hops which may be determined based on an attribute of the packet such as priority, QoS requirement(s), time period of relevancy, or the like.

At 746 of flowchart 730, a selected Relay WTRU may be selected from the plurality of Relay WTRUs. The selected Relay WTRU may be selected based on a signaling capability of selected WTRU matching the traffic type of the packet generated at 744, the maximum number of hops associated with the packet received at 744, and on the Remote WTRU relay capabilities table (e.g., the Remote WTRU relay capabilities table may include information about the selected Relay WTRU that corresponds to its signaling capabilities as well its number of hops to a core network). Notably, the selected Relay WTRU may be selected based on the number of hops to reach the core network from the selected Relay WTRU being less than a first updated number of hops, as disclosed herein.

At 748 of flowchart 730, the packet generated at 744 may be transmitted by the Remote WTRU. The packet may be received by the intended selected Relay WTRU. At 750 a first updated packet may be generated based on the packet generated at 744 and transmitted at 748. The first updated packet may include the payload from the packet generated at 744 and may have a updated number of hops that is one less than the maximum number of hops. Notably, the first updated packet may have an updated header that has a revised maximum number of hops (i.e., revised to the first number of hops which is one less than the maximum number of hops). To clarify, the first number of hops may incorporate the hop from the Remote WTRU to the selected Relay WTRU. The first updated packet generated at 748 may be generated at the Remote WTRU and/or the selected Relay WTRU such that it may be generated prior to being transmitted by the Remote WTRU and/or after being transmitted by the Remote WTRU.

At 752 of flowchart 730, the first updated packet may be transmitted based on the traffic type, the second updated number of hops, and/or a selected WTRU relay capabilities table in a manner similar to the transmission of the packet to the selected Relay WTRU at 748. The first updated packet may be received by a subsequent selected Relay WTRU if one or more additional hops is required such that each additional hop may result in an updated packet that includes the payload from the packet generated at 744. The subsequent selected Relay WTRU may be an Edge WTRU that is connected to the core network. At 754 of flowchart 730, the payload from the packet generated at 744 may be received at the core network, completing the UL transmission from the core network to the remote WTRU.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for multi-hop relay transmission performed by a first wireless transmit/receive unit (WTRU), the method comprising:
   broadcasting information indicating first relaying capabilities associated with at least one traffic type and a number of hops required to reach a core network from the first WTRU;
   receiving, from each of a plurality of WTRUs, a broadcast indicating respective second relaying capabilities and an advertised number of hops required to reach a third WTRU from each of the plurality of WTRUs, wherein each of the advertised number of hops to reach the third WTRU is associated with a traffic type;
   broadcasting an identifier associated with the third WTRU and information indicating at least a subset of the respective second relaying capabilities that match the first relaying capabilities and the number of hops required to reach the third WTRU from the first WTRU;
   receiving a first packet associated with a traffic type and including information indicating a first maximum number of hops and a direction;
   selecting a second WTRU of the plurality of WTRUs based on the traffic type, the first maximum number of hops, and the respective second relaying capabilities; and
   transmitting a second packet to the selected second WTRU, the second packet including information indicating the traffic type, the direction, and a second maximum number of hops that is greater than zero and one less than the first maximum number of hops.

2. The method of claim 1, wherein the first packet includes downlink data from the core network.

3. The method of claim 1, wherein the first packet includes uplink data from the third WTRU.

4. The method of claim 1, wherein the first relaying capabilities are determined based on the broadcasts from each of the plurality of WTRUs.

5. The method of claim 1, wherein the second packet further comprises information identifying the third WTRU.

6. The method of claim 1, wherein the traffic type is one of Mobility Management (MM) signaling, Session Management (SM) signaling, or user plane data.

7. The method of claim 1, wherein the second maximum number of hops is different from the first maximum number of hops.

8. The method of claim 1, further comprising establishing a one-to-one connection with the selected second WTRU.

9. The method of claim 1, wherein the first packet is received from the third WTRU.

10. A first wireless transmit/receive unit (WTRU) comprising:
    a processor; and
    a transceiver;
    the transceiver configured to:
      broadcast information indicating first relaying capabilities associated with at least one traffic type and a number of hops required to reach a core network from the first WTRU;
      receive, from each of a plurality of WTRUs, a broadcast indicating respective second relaying capabilities and an advertised number of hops required to reach a third WTRU from each of the plurality of WTRUs, wherein each of the advertised number of hops to reach the third WTRU is associated with a traffic type;
      broadcast an identifier associated with the third WTRU and information indicating at least a subset of the respective second relaying capabilities that match the first relaying capabilities and the number of hops required to reach the third WTRU from the first WTRU; and
      receive a first packet associated with a traffic type and including information indicating a first maximum number of hops and a direction;
    the processor configured to select a second WTRU of the plurality of WTRUs based on the traffic type, the first maximum number of hops, and the respective second relaying capabilities; and
    the transceiver configured to transmit a second packet to the selected second WTRU, the second packet including information indicating the traffic type, the direction, and a second maximum number of hops that is greater than zero and one less than the first maximum number of hops.

11. The WTRU of claim 10, wherein the first packet includes downlink data from the core network.

12. The WTRU of claim 10, wherein the first packet includes uplink data from the third WTRU.

13. The WTRU of claim 10, wherein the first relaying capabilities are determined based on the broadcasts from each of the plurality WTRUs.

14. The WTRU of claim 10, wherein the second packet further comprises information identifying the third WTRU.

15. The WTRU of claim 10, wherein the traffic type is one of Mobility Management (MM) signaling, Session Management (SM) signaling, or user plane data.

16. The WTRU of claim 10, wherein the second maximum number of hops is different from the first maximum number of hops.

17. The WTRU of claim 10, further comprising establishing a one-to-one connection with the selected second WTRU.

18. The WTRU of claim 10, wherein the first packet is received from the third WTRU.

* * * * *